United States Patent
Chu et al.

(10) Patent No.: US 10,834,639 B2
(45) Date of Patent: Nov. 10, 2020

(54) WIFI OPERATION WITH CHANNEL AGGREGATION

(71) Applicant: NXP USA, Inc., Austin, TX (US)

(72) Inventors: Liwen Chu, San Ramon, CA (US); Hongyuan Zhang, Fremont, CA (US); Hui-Ling Lou, Sunnyvale, CA (US)

(73) Assignee: NXP USA, INC., Austin, TX (US)

( * ) Notice: Subject to any disclaimer, the term of this patent is extended or adjusted under 35 U.S.C. 154(b) by 17 days.

(21) Appl. No.: 16/179,634

(22) Filed: Nov. 2, 2018

(65) Prior Publication Data
US 2019/0182714 A1 Jun. 13, 2019

Related U.S. Application Data

(63) Continuation of application No. 62/596,637, filed on Dec. 8, 2017.

(51) Int. Cl.
*H04W 28/20* (2009.01)
*H04W 72/04* (2009.01)
(Continued)

(52) U.S. Cl.
CPC .......... *H04W 28/20* (2013.01); *H04W 24/08* (2013.01); *H04W 72/04* (2013.01); *H04W 74/08* (2013.01); *H04W 76/00* (2013.01); *H04W 84/12* (2013.01)

(58) Field of Classification Search
CPC ..... H04W 24/08; H04W 28/20; H04W 74/04; H04W 74/08; H04W 76/00
See application file for complete search history.

(56) References Cited

U.S. PATENT DOCUMENTS 8,773,969 B1 7/2014 Zhang et al.
8,787,385 B2 7/2014 Liu et al.
(Continued)

FOREIGN PATENT DOCUMENTS

EP 2028809 A2 2/2009
EP 2999252 3/2016
(Continued)

OTHER PUBLICATIONS

Fischer et al., "IEEE P802.11—Wireless LANs—Disallowed Sub channels," doc. No. IEEE 802.11-18/0496r3, *The Institute of Electrical and Electronics Engineers*, pp. 1-11 (May 2018).
(Continued)

*Primary Examiner* — Walli Z Butt
*Assistant Examiner* — Ryan C Kaleski

(57) ABSTRACT

A first communication device configured is for communication with one or more second communication devices over a communication channel. The first communication device generates a first bandwidth indication of a first bandwidth of a first channel segment of the communication channel, and generates a second bandwidth indication, separate from the first bandwidth indication, of a second bandwidth of a second channel segment of the communication channel. The first channel segment does not overlap in frequency with the second channel segment. The first communication device generates one or more media access control protocol (MAC) data units to include the first bandwidth indication and the second bandwidth indication, and transmits the one or more MAC data units to the one or more second communication devices to indicate the first bandwidth of the first channel segment and the second bandwidth of the second channel segment to the one or more second communication devices.

18 Claims, 11 Drawing Sheets

(51) Int. Cl.
*H04W 76/00* (2018.01)
*H04W 24/08* (2009.01)
*H04W 74/08* (2009.01)
*H04W 84/12* (2009.01)

(56) References Cited

U.S. PATENT DOCUMENTS

| | | | |
|---|---|---|---|
| 10,257,806 | B2 | 4/2019 | Chu et al. |
| 10,349,413 | B2 | 7/2019 | Zhang et al. |
| 2010/0322141 | A1* | 12/2010 | Liu ............. H04W 24/10 370/315 |
| 2011/0096747 | A1 | 4/2011 | Seok |
| 2011/0249659 | A1 | 10/2011 | Fontaine et al. |
| 2016/0212748 | A1 | 7/2016 | Yang et al. |
| 2017/0149547 | A1 | 5/2017 | Kim et al. |
| 2017/0181136 | A1 | 6/2017 | Bharadwaj et al. |
| 2017/0257888 | A1 | 9/2017 | Kneckt et al. |
| 2017/0295571 | A1 | 10/2017 | Chu et al. |
| 2017/0302422 | A1 | 10/2017 | Chu et al. |
| 2017/0311204 | A1* | 10/2017 | Cariou ............. H04W 28/085 |
| 2017/0325178 | A1 | 11/2017 | Verma et al. |
| 2017/0338935 | A1* | 11/2017 | Ahn ............. H04W 72/0446 |
| 2017/0366329 | A1 | 12/2017 | Cao et al. |
| 2018/0115403 | A1 | 4/2018 | Sakai et al. |
| 2018/0302858 | A1 | 10/2018 | Son et al. |
| 2019/0082461 | A1* | 3/2019 | Guo ............. H04L 5/0094 |
| 2019/0123863 | A1 | 4/2019 | Zhang et al. |
| 2019/0182714 | A1 | 6/2019 | Chu et al. |
| 2019/0182863 | A1 | 6/2019 | Chu et al. |
| 2019/0289576 | A1 | 9/2019 | Park et al. |
| 2019/0349930 | A1 | 11/2019 | Chu et al. |

FOREIGN PATENT DOCUMENTS

| | | |
|---|---|---|
| GB | 2501898 A | 11/2013 |
| WO | WO-2006/000955 A1 | 1/2006 |
| WO | WO-2012/026779 A2 | 3/2012 |
| WO | WO-2015/099803 | 7/2015 |
| WO | WO-2017/026937 | 2/2017 |
| WO | WO-2017/111567 A2 | 6/2017 |

OTHER PUBLICATIONS

Orfanos et al., "A New Distributed Coordination Function for W-LANs with Multiple Channel Structure," Proceedings of the 14th 1st Mobile and Wireless Communications Summit; Dresden, Germany, 5 pages (Jun. 19, 2005).

International Search Report and Written Opinion in International Patent Application No. PCT/US2018/059022, dated Feb. 11, 2019 (12 pages).

Chen et al., "TGaj Complete Proposal (60GHz)," IEEE Draft 802.11-13, 13/1301r2, vol. 802.11aj, No. 2, 34 pages (Jan. 8, 2014).

U.S. Appl. No. 16/162,113, Zhang et al., "WiFi Channel Aggregation," filed Oct. 16, 2018.

U.S. Appl. No. 16/178,647, Chu et al., "WiFi Operation Channel Aggregation," filed Nov. 2, 2018.

IEEE Std 802.11-REVmc™/D8.0 (revision of IEEE Std. 802.11™—2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

IEEE Std 802.11ac/D7.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.11ac™—2013 "IEEE Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-425 (Dec. 18, 2013).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).

IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages (Sep. 2016).

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

IEEE P802.11ax™/D1.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

Zhang et al; "EHT Technology Candidate Discussions"; doc: IEEE 802.11-18/1161r0; The Institute of Electrical and Electronics Engineers, Inc.; pp. 1-10 (Jul. 8, 2018).

Notice of Allowance; U.S. Appl. No. 16/179,647; 8 pages (dated May 29, 2020).

Notice of Allowance dated Jul. 31, 2020 in U.S. Appl. No. 16/179,647.

* cited by examiner

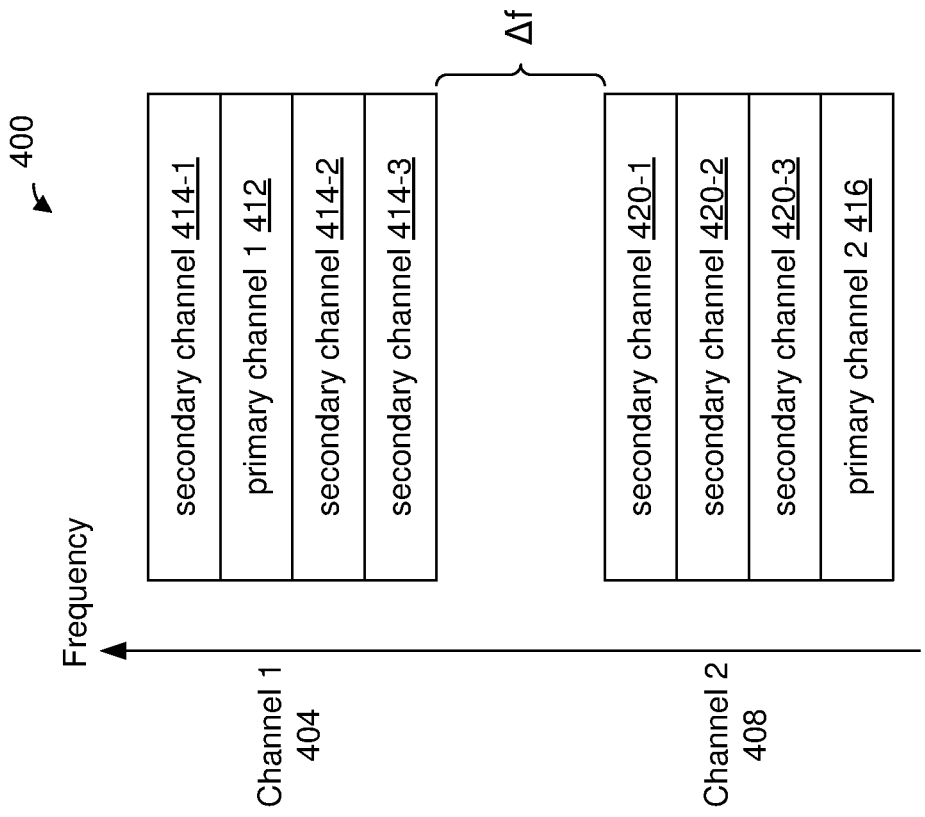

WIFI OPERATION WITH CHANNEL AGGREGATION

CROSS REFERENCES TO RELATED APPLICATIONS

This application claims the benefit of U.S. Provisional Patent Application No. 62/596,637, entitled "MAC Support of WiFi Channel Aggregation," filed on Dec. 8, 2017, which is hereby incorporated herein by reference in its entirety.

FIELD OF TECHNOLOGY

The present disclosure relates generally to wireless communication systems, and more particularly to media access channel (MAC) support for data transmission and reception over multiple communication channels.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

SUMMARY

In an embodiment, a method for operation of a first communication device in a communication channel between the first communication device and one or more second communication devices includes: generating, at a network interface of the first communication device, a first bandwidth indication of a first bandwidth of a first channel segment of the communication channel; generating, at the network interface device, a second bandwidth indication of a second bandwidth of a second channel segment of the communication channel, the second bandwidth indication being separate from the first bandwidth indication, wherein the first channel segment does not overlap in frequency with the second channel segment; generating, at the network interface device, one or more media access control protocol (MAC) data units to include the first bandwidth indication and the second bandwidth indication; and transmitting, with the network interface device, the one or more MAC data units to the one or more second communication devices to indicate the first bandwidth of the first channel segment and the second bandwidth of the second channel segment to the one or more second communication devices.

In another embodiment, a first communication device configured for communication with one or more second communication devices over a communication channel, the first communication device comprising a network interface device configured to: generate a first bandwidth indication of a first bandwidth of a first channel segment of the communication channel; generate a second bandwidth indication of a second bandwidth of a second channel segment of the communication channel, the second bandwidth indication being separate from the first bandwidth indication, wherein the first channel segment does not overlap in frequency with the second channel segment; generate one or more media access control protocol (MAC) data units to include the first bandwidth indication and the second bandwidth indication; and transmit the one or more MAC data units to the one or more second communication devices to indicate the first bandwidth of the first channel segment and the second bandwidth of the second channel segment to the one or more second communication devices.

BRIEF DESCRIPTION OF THE DRAWINGS

FIG. 4A is a diagram of an example operating channel, according to an embodiment;

FIG. 4B is a diagram of an example operating channel, according to another embodiment;

DETAILED DESCRIPTION

Multi-channel communication techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, multi-channel communication techniques are utilized in other types of wireless communication systems such as personal area networks (PANs), mobile communication networks such as cellular networks, metropolitan area networks (MANs), satellite communication networks, etc.

Figure 1:
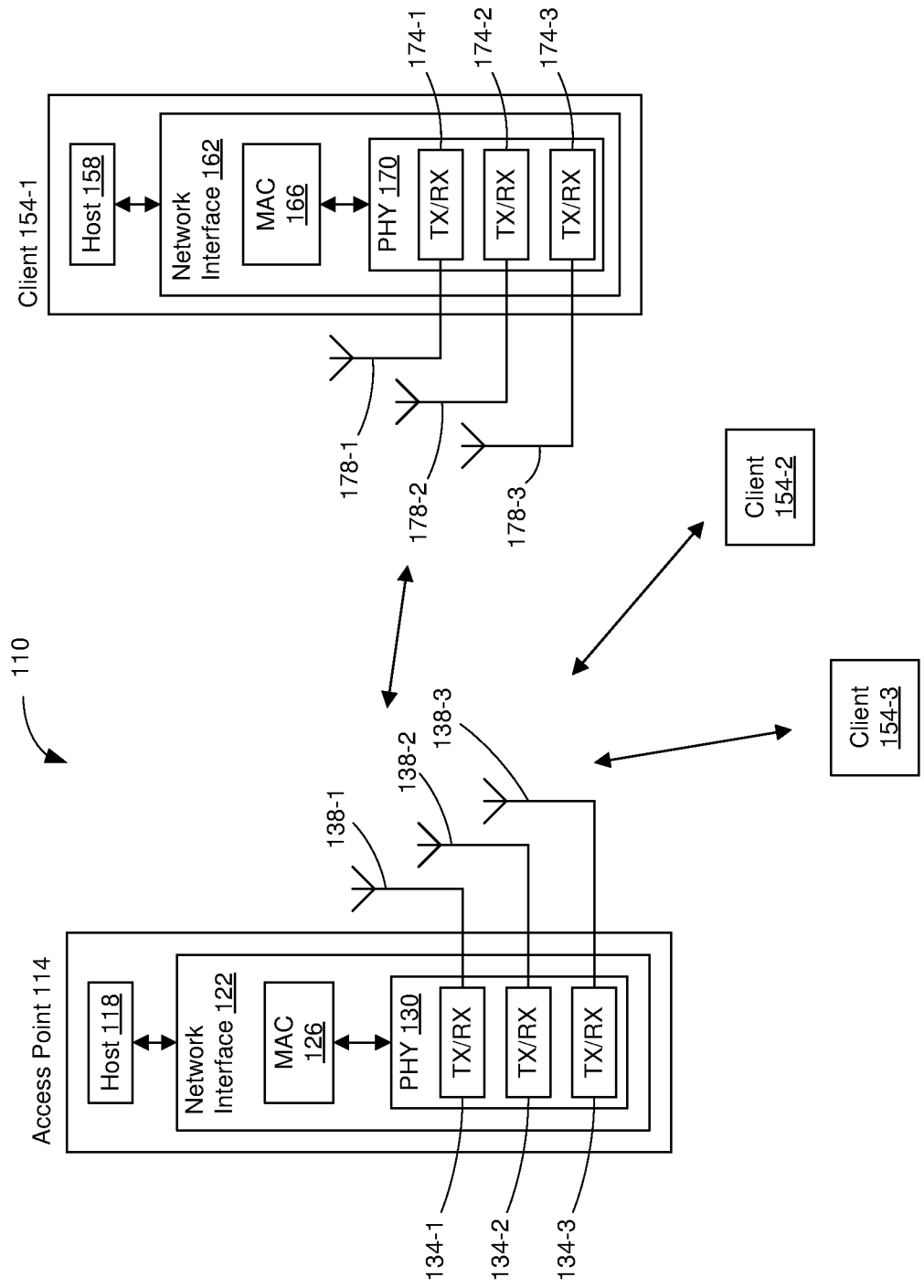
FIG. 1 is a block diagram of an example wireless local area network (WLAN), according to an embodiment.

FIG. 1 is a block diagram of an example wireless local area network (WLAN) 110, according to an embodiment. The WLAN 110 includes an access point (AP) 114 that comprises a host processor 118 coupled to a network interface device 122. The network interface device 122 includes one or more medium access control (MAC) processors 126 (sometimes referred to herein as "the MAC processor 126" for brevity) and one or more physical layer (PHY) processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

PHY data units are sometimes referred to herein as "packets," and MAC layer data units are sometimes referred to herein as "frames."

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more signals RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In another embodiment, the MAC processor 126 includes a hardware state machine.

In an embodiment, the MAC processor 126 and the PHY processor 130 are configured to operate according to a first WLAN communication protocol, and also according to one or more second WLAN communication protocols (e.g., as defined by one or more of the IEEE 802.11n Standard, IEEE 802.11ac Standard, the IEEE 802.11ax Standard and/or other suitable WLAN communication protocols) that are legacy protocols with respect to the first WLAN communication protocol. The one or more second WLAN communication protocols are sometimes collectively referred to herein as a "legacy WLAN communication protocol" or simply "legacy protocol."

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154 includes a host processor 158 coupled to a network interface device 162. The network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154 includes other suitable numbers (e.g., 1, 2, 4, 5, etc.) of transceivers 174 and antennas 178 in other embodiments. In some embodiments, the client station 154 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface device 162 may be implemented on a single IC.

In various embodiments, the MAC processor 166 and the PHY processor 170 of the client device 154 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, the MAC processor 166 and the PHY processor 170 are configured to operate according to the first WLAN communication protocol, and also according to the legacy WLAN communication protocol.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

In an embodiment, one or both of the client stations 154-2 and 154-3 are configured to operate according to the legacy WLAN communication protocol, but not according to the first WLAN communication protocol. Such client stations are referred to herein as "legacy client stations." Similarly, an access point that is similar to the AP 114 and is configured to operate according to the legacy WLAN communication protocol, but not according to the first WLAN communication protocol, is referred to herein as a "legacy AP." More generally, wireless communication devices that are configured to operate according to the legacy WLAN communication protocol, but not according to the first WLAN communication protocol, are referred to herein as a "legacy communication devices."

Figure 2A:
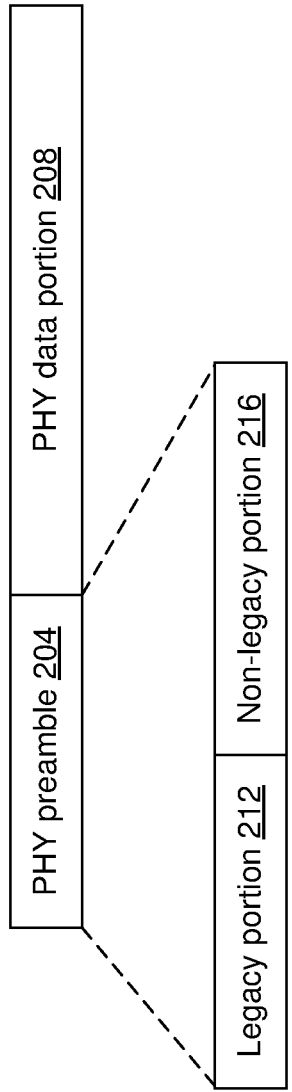
FIG. 2A is a block diagram of an example physical layer (PHY) data unit, according to an embodiment.

FIG. 2A is a diagram of an example PPDU 200 that the network interface device 122 (FIG. 1) is configured to generate and transmit to one or more client stations 154 (e.g., the client station 154-1), according to an embodiment. The network interface device 162 (FIG. 1) may also be configured to transmit data units the same as or similar to the PPDU 200 to the AP 114. The PPDU 200 may occupy a 20 MHz bandwidth or another suitable bandwidth. Data units similar to the PPDU 200 occupy other suitable bandwidth such as 40 MHz, 60 MHz, 80 MHz, 100 MHz, 120 MHz, 140 MHz, 160 MHz, 180 MHz, 200 MHz, etc., for example, or other suitable bandwidths, in other embodiments.

The PPDU 200 includes a PHY preamble 204 and a PHY data portion 208. The PHY preamble 204 may include at least one of a legacy portion 212 and a non-legacy portion 216, in at least some embodiments. In an embodiment, the legacy portion 212 is configured to be processed by legacy communication devices in the WLAN 110 (i.e., communication devices that operate according to a legacy communication protocol), enabling the legacy communication devices to detect the PPDU 200 and to obtain PHY information corresponding to the PPDU 200, such as a duration of the PPDU 200.

Figure 2B:
FIG. 2B is a block diagram of an example preamble of a PHY data unit, according to an embodiment.

FIG. 2B is a diagram of an example PHY preamble 220. In an embodiment, the PHY preamble 220 corresponds to the PHY preamble 204. In an embodiment, the PHY preamble 220 is included in the legacy portion 212. In another embodiment, the PHY preamble 220 is included in the non-legacy portion 216. The PHY preamble 220 includes one or more short training fields (STFs) 224, one or more long training field (LTFs) 228, and one or more signal fields (SIGs) 232. In an embodiment, the STFs 224 and the LTFs 228 are used for packet detection, automatic gain control (AGC), frequency offset estimation, channel estimation, etc. In an embodiment, the number of LTFs in the LTFs 228 correspond to a number of spatial/space-time streams used for transmission of the PPDU 200. In an embodiment, the SIGs 232 are used to signal PHY communication parameters (e.g., a modulation and coding scheme (MCS), a number of spatial streams, a frequency bandwidth, etc.) corresponding to the PPDU 200.

In some embodiments, the PHY preamble 220 omits one or more of the fields 224-232. In some embodiments, the PHY preamble 220 includes one or more additional fields not illustrated in FIG. 2B. In some embodiments, the order of the fields 224-232 is different than illustrated in FIG. 2B. In an embodiment, the PPDU 200 is generated and transmitted as a sequence of orthogonal frequency division multiplexing (OFDM) symbols. In an embodiment, each of the STF 224, the LTF 228, the SIG 232, and the data portion 208 comprises one or more OFDM symbols.

In an embodiment, the AP 114 and a plurality of client stations 154 are configured for multiple user (MU) communication using orthogonal frequency division multiple access (OFDMA) transmissions. In an embodiment, the PPDU 200 is an MU OFDMA data unit in which independent data streams are transmitted to or by multiple client stations 154 using respective sets of OFDM tones allocated to the client stations 154. For example, in an embodiment, available OFDM tones (e.g., OFDM tones that are not used as DC tone and/or guard tones) are segmented into multiple resource units (RUs), and each of the multiple RUs is allocated to data to one or more client stations 154. In an embodiment, the independent data streams in respective allocated RUs are further transmitted using respective spatial streams, allocated to the client stations 154, using multiple-input multiple-output (MIMO) techniques. In an embodiment, the PPDU 200 is an MU-MIMO PHY data unit in which independent data streams are transmitted to multiple client stations 154 using respective spatial streams allocated to the client stations 154.

In an embodiment, an operating communication channel of a communication device in the WLAN 110 is divided into a plurality of smaller component channels, each corresponding to a width of 20 MHz, or another suitable frequency bandwidth. Multiple component channels may be concatenated, or "bonded" to form a wider channel. For instance, a 40 MHz channel may be formed by combining two 20 MHz component channels, an 80 MHz channel may be formed by combining two 40 MHz channels, a 160 MHz channel may be formed by combining two 80 MHz channels, in an embodiment. In an embodiment, the operating frequency band is divided into component channels of a width different than 20 MHz.

In an embodiment, the PPDU 200 has a 20 MHz frequency bandwidth and is transmitted in a 20 MHz channel. In other embodiments, the PPDU 200 may have a frequency bandwidth of 40 MHz, 80 MHz, 100 MHz, 120 MHz, etc., and is correspondingly transmitted over a 40 MHz, 80 MHz, 100 MHz, 120 MHz, etc., channel, respectively. In some such embodiments, at least a portion of the PPDU 200 (e.g., at least a legacy portion of the PHY preamble 204, or the entirety of the PHY preamble 204) is generated by generating a field corresponding to a 20 MHz component channel bandwidth and repeating the field over a number of 20 MHz component channels corresponding to the transmission channel, in an embodiment. For example, in an embodiment in which the PPDU 200 occupies an 80 MHz channel, at least the legacy portion 212 corresponding to the 20 MHz component channel bandwidth is replicated in each of four 20 MHz component channels that comprise the 80 MHz channel.

In an embodiment, one or more communication devices in the WLAN 110 (e.g., the AP 114, the client station 154, etc.) are configured for various multi-channel operations. In an embodiment corresponding to multi-channel operation, two or more communication channels (also sometimes referred to herein as a "channel segments") are aggregated to form an aggregate channel for synchronous transmission or reception over the two or more communication channels in the WLAN 110. For instance, in an embodiment, the AP 114 is configured to transmit a first signal in a first communication channel segment (sometimes referred to herein as "first channel segment"), and simultaneously transmit a second signal over a second channel segment (sometimes referred to herein as "second channel segment"), wherein the AP 114 commences transmission of the first signal and the second signal at a same start time. In an embodiment, the AP 114 is configured to cease transmission of the first signal and the second signal at a same end time. In an embodiment, the AP 114 is configured to receive a first signal in a first channel segment and simultaneously receive a second signal over a second channel segment, wherein the first signal and the second signal have an identical start time. In an embodiment, the first signal and the second signal identical end times.

In an embodiment corresponding to multi-channel operation, the first channel segment and the second channel segment are non-contiguous, i.e., there is a gap in frequency between the first channel segment and the second channel segment. In another embodiment, the first channel segment and the second channel segment are contiguous, i.e., there is no frequency gap between the first channel segment and the second channel segment. In an embodiment, the first channel segment and the second channel segment are of different frequency bandwidths. In an embodiment, the first channel segment and the second channel segment consist of respective different numbers of component channels. In another embodiment, the first channel segment and the second channel segment are of a same bandwidth and consist of a same number of component channels.

In an embodiment, different communication devices (i.e., the AP 114 and the client stations 154) may be configured for operation in different frequency bands. In an embodiment, at least some communication devices (e.g., the AP 114 and the client station 154) in the WLAN 110 may be configured for operation over multiple different frequency bands. Exemplary frequency bands include, a first frequency band corresponding to a frequency range of approximately 2.4 GHz-2.5 GHz ("2 GHz band"), and a second frequency band corresponding to a frequency range of approximately 5 GHz-5.9 GHz ("5 GHz band") of the RF spectrum. In an embodiment, one or more communication devices within the WLAN may also be configured for operation in a third frequency band in the 6 GHz-7 GHz range ("6 GHz band"). Each of the frequency bands comprises multiple component channels which may be combined within the respective frequency bands to generate channels of wider bandwidths, as described above. In an embodiment corresponding to multi-channel operation over multiple communication channel segments aggregated to form an aggregated communication channel, at least some of the multiple channel segments may be in different ones of multiple frequency bands, or the multiple channel segments may be within a same frequency band.

In an embodiment, the first WLAN communication protocol permits a greater variety of communication channel configurations than is permitted by the legacy WLAN communication protocol. For example, the legacy WLAN communication protocol permits certain combinations of component channels to form communication channels of certain bandwidths, whereas the first WLAN communication protocol permits additional component channel combinations in addition to the component channel combinations permitted by the legacy WLAN communication protocol. For example, whereas the legacy WLAN communication protocol permits contiguous bandwidths of 20 MHz, 40 MHz, 80 MHz, and 160 MHz and a split frequency bandwidth 80+80 MHz, the first WLAN communication protocol additionally permits contiguous bandwidths of 60 MHz, 100 MHz, 120 MHz, 140 MHz, and split frequency bandwidths of 20+20 MHz, 20+40 MHz, 20+80 MHz, 40+40 MHz, 40+80 MHz, etc., in various embodiments.

In an embodiment, a communication device (e.g., the AP 114, the client station 154-1, etc.) configured to operate according to the first WLAN communication protocol includes multiple RF radios, where respective ones of the multiple RF radios transmit/receive signals in respective channel segments of an aggregate communication channel. The signals transmitted/received by respective ones of the multiple RF radios are synchronously transmitted/received in contiguous or non-contiguous channel segments, in various embodiments. For example, a signal transmitted/received in an 80 MHz-wide channel segment by a first RF radio and a signal in a 40 MHz-wide channel segment is synchronously transmitted/received by a second RF radio, where the 80 MHz-wide and the 40 MHz-wide channel segments form a contiguous 120 MHz channel bandwidth in one embodiment, and form a non-contiguous 80+40 MHz channel bandwidth in another embodiment.

Figure 3A:
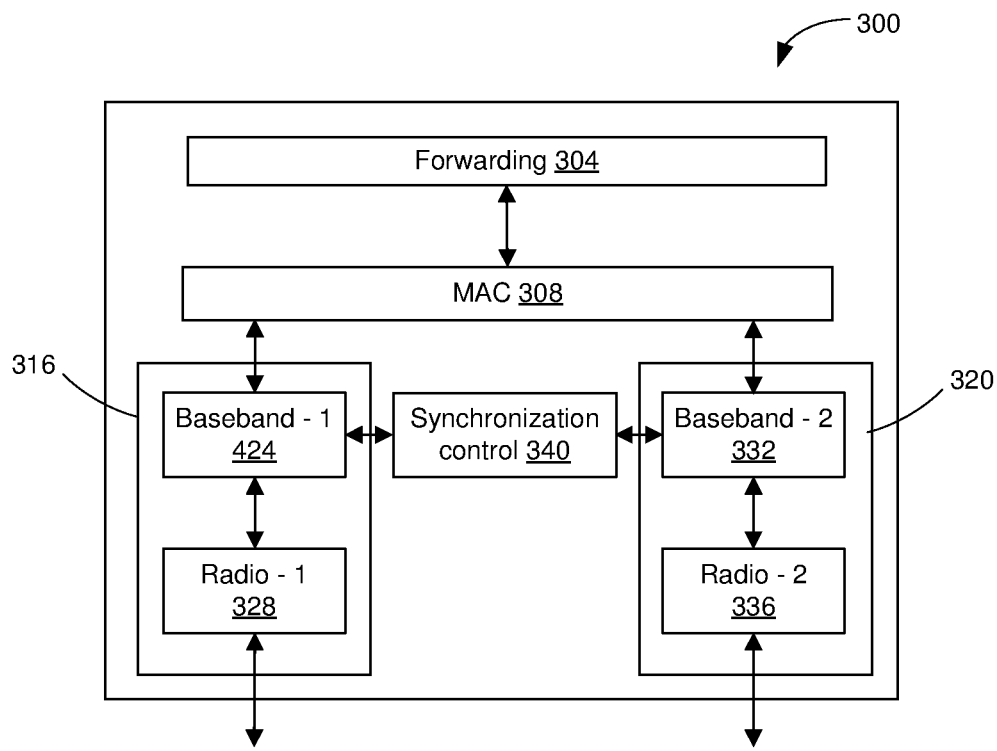
FIG. 3A is a diagram of an example system architecture corresponding to a communication device configured for multi-channel operation, according to an embodiment.

FIG. 3A is a diagram of an example system architecture 300 corresponding to a communication device configured for multi-channel operation, according to an embodiment. For instance, in an embodiment, the system architecture 300 is configured for synchronous transmission/reception over aggregated communication channel segments. In an embodiment, the system architecture 300 corresponds to the AP 114. In another embodiment, the system architecture 300 corresponds to the client station 154-1.

In an embodiment, the system architecture 300 is configured for operation over two communication channel segments and includes a forwarding processor 304. The communication device 300 also includes a single MAC processor 308, a first PHY processor 316, and a second PHY processor 320. The single MAC processor 308 is coupled to the first PHY processor 316 and the second PHY processor 320. The single MAC processor 308 exchanges frames with the first PHY processor 316 and the second PHY processor 320.

In an embodiment, the single MAC processor 308 corresponds to the MAC processor 126 of FIG. 1. In another embodiment, the single MAC processor 308 corresponds to the MAC processor 166 of FIG. 1. In an embodiment, the first PHY processor 316 and the second PHY processor 320 correspond to the PHY processor 130 of FIG. 1. In another embodiment, the first PHY processor 316 and the second PHY processor 320 correspond to the PHY processor 170 of FIG. 1.

The first PHY processor 316 includes a first baseband signal processor 324 (Baseband-1) coupled to a first RF radio 328 (Radio-1). The second PHY processor 320 includes a second baseband signal processor 332 (Baseband-2) coupled to a second RF radio 336 (Radio-2). In an embodiment, the RF radio 328 and the RF radio 336 correspond to the transceivers 134 of FIG. 1. In an embodiment, the RF radio 328 is configured to operate on a first RF band, and the RF radio 336 is configured to operate on a second RF band. In another embodiment, the RF radio 328 and the RF radio 336 are both configured to operate on the same RF band.

In an embodiment, the MAC processor 308 generates and parses data corresponding to MAC layer data units (e.g., frames) into a plurality of data streams corresponding to respective communication channel segments. The MAC processor 308 provides the parsed data streams to the Baseband-1 324 and the Baseband-2 332. The Baseband-1 324 and the Baseband-2 332 are configured to receive the respective data streams from the MAC processor 308, and encapsulate and encode the respective data streams to generate respective baseband signals corresponding to PPDUs. In an embodiment, the respective baseband signals have different bandwidths. The Baseband-1 324 and the Baseband-2 332 provide the respective baseband signals to the Radio-1 328 and the Radio-2 336. The Radio-1 328 and Radio-2 336 upconvert the respective baseband signals to generate respective RF signals for transmission via the first channel segment and the second channel segment, respectively. The Radio-1 328 transmits a first RF signal via the first channel segment and the Radio-2 336 transmits a second RF signal via a second channel segment.

The communication device 300 also includes synchronization control circuitry 340. The synchronization control circuitry 340 is configured to ensure that respective transmitted signals over the first channel segment and the second channel segment are synchronized. The synchronization control circuitry 340 is coupled to the Baseband-1 324 and the Baseband-2 332 to ensure that the respective baseband signals are synchronized in time.

The Radio-1 328 and the Radio-2 336 are also configured to receive respective RF signals via the first channel segment and the second channel segment, respectively. The Radio-1 328 and the Radio-2 336 generate respective baseband signals corresponding to the respective received signals. In an embodiment, the generated respective baseband signals have different bandwidths. The generated respective baseband signals are provided to the respective baseband signal processors Baseband-1 324 and Baseband-2 332. The Baseband-1 324 and the Baseband-2 332 generate respective data streams that are provided to the MAC processor 308. The MAC processor 308 processes the respective data streams. In an embodiment, the MAC processor 308 deparses the data streams received from the Baseband-1 324 and the Baseband-2 332 into a single information bit stream.

In an embodiment, the forwarding processor 304 is omitted and the MAC processor 308 is coupled to another suitable processor (e.g., the host processor 118 (FIG. 1)) that performs one or more higher level operations corresponding to data transmission and reception. For instance, in an embodiment, the other processor performs one or more operations corresponding to Layer 3 and above as characterized in the OSI model.

Figure 3B:
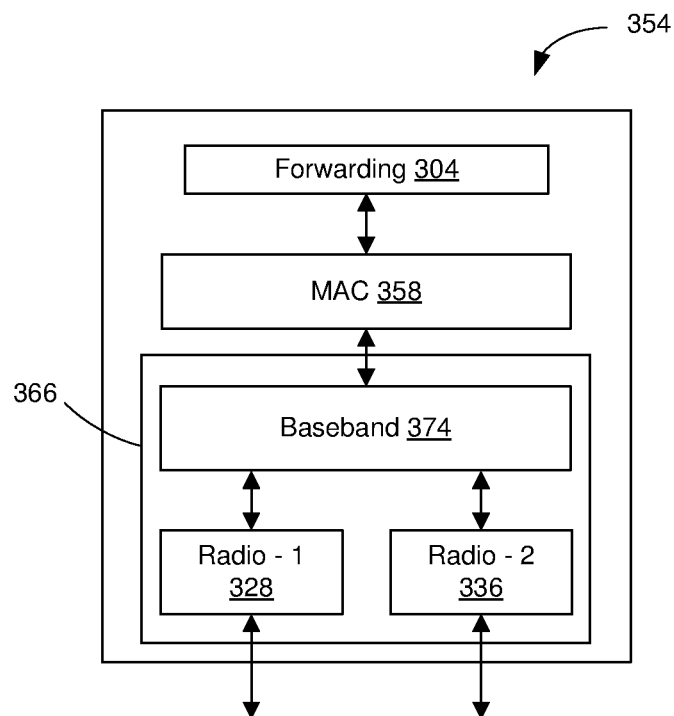
FIG. 3B is a diagram of an example system architecture corresponding to a communication device configured for multi-channel operation, according to another embodiment.

FIG. 3B is a diagram of an example system architecture 350 corresponding to a communication device configured for multi-channel operation, according to another embodiment. For instance, in an embodiment, the system architecture 350 is configured for synchronous transmission/reception over aggregated communication channels. In an embodiment, the system architecture 350 corresponds to the AP 114. In another embodiment, the system architecture 350 corresponds to the client station 154-1.

The system architecture 350 is similar to the system architecture 300 of FIG. 3A, and like-numbered elements are not discussed in detail for purposes of brevity.

The communication device 350 includes a single MAC processor 358 coupled to a PHY processor 366. The single MAC processor 308 exchanges frames with the PHY processor 366.

In an embodiment, the single MAC processor 358 corresponds to the MAC processor 126 of FIG. 1. In another embodiment, the single MAC processor 358 corresponds to the MAC processor 166 of FIG. 1. In an embodiment, the PHY processor 366 corresponds to the PHY processor 130 of FIG. 1. In another embodiment, the PHY processor 366 corresponds to the PHY processor 170 of FIG. 1.

The PHY processor 366 includes a single baseband signal processor 374. The single baseband signal processor 374 is coupled to the Radio-1 328 and the Radio-2 336.

In an embodiment, the MAC processor 358 generates data corresponding to MAC layer data units (e.g., frames) and provides the frames to the baseband signal processor 374. The baseband signal processor 374 is configured to receive frames from the MAC processor 358, and parse data corresponding to the frames into a plurality of bit streams. The baseband signal processor 374 is also configured to encapsulate and encode the respective bit streams to generate respective baseband signals corresponding to PPDUs. In an embodiment, the respective baseband signals have different bandwidths. The baseband signal processor 374 provides the respective baseband signals to the Radio-1 328 and the Radio-2 336. The Radio-1 328 and Radio-2 336 upconvert the respective baseband signals to generate respective RF signals for transmission via the first channel segment and the second channel segment, respectively. The Radio-1 820 transmits a first RF signal via the first channel segment and the Radio-2 336 transmits a second RF signal via a second channel segment.

The baseband signal processor 374 is configured to ensure that respective transmitted signals over the first channel segment and the second channel segment are synchronized. For example, the baseband signal processor 374 is configured to generate the respective baseband signals such that the respective baseband signals are synchronized in time.

The Radio-1 328 and the Radio-2 336 are also configured to receive respective RF signals via the first channel segment and the second channel segment, respectively. The Radio-1 328 and the Radio-2 336 generate respective baseband signals corresponding to the respective received signals. In an embodiment, the generated respective baseband signals have different bandwidths. The generated respective baseband signals are provided to the baseband signal processor 374. The baseband signal processor 374 generate respective bit streams, and de-parse the bit streams into a data stream corresponding to frames. The baseband signal processor 374 provides the frames to the MAC processor 358. The MAC processor 358 processes the frames.

As discussed above, in an embodiment, an operating communication channel of a communication device in the WLAN 110 is divided into a plurality of smaller component channels. In an embodiment, at least one of the smaller component channels is designated as a primary channel and the remaining component channels are secondary channels. A communication device (e.g., the AP 114 or the client station 154-1) operating in the WLAN 110 utilizes the at least one smaller component channel that is designated as a primary channel for various operations, such as for transmission of various management transmissions (e.g., transmissions associated with association of a client station 154 with the AP 114, beacon transmissions by the AP 114, operating channel bandwidths switch announcement transmissions, etc.), for conducting clear channel assessment (CCA) procedures, etc. In an embodiment, an aggregate operating channel of a communication device (e.g., the AP 114 or the client station 154-1) includes multiple primary channels. For example, in an embodiment in which a first channel segment is aggregated with a second channel segment to form an aggregate communication channel, a first component channel in the first channel segment is designated as a first primary channel of the aggregate communication channel and a second component channel in the second channel segment is designated in a second primary channel of the aggregate communication channel. In another embodiment, an aggregate communication channel of a communication device (e.g., the AP 114 or the client station 154-1) includes a single primary channel. For example, in an embodiment in which a first channel segment is aggregated with a second channel segment form an aggregate communication channel, a component channel in one of the first channel segment and the second channel segment is designated as a primary channel of the aggregate communication channel. The other one of the first channel segment and the second channel segment does not include a primary channel, in this embodiment.

FIG. 4A is a diagram of an example operating channel 400, according to an embodiment. In an embodiment, the operating channel 400 corresponds to an operating channel of the AP 114, or of a basic service set (BSS) supported by the AP 114. In another embodiment, the operating channel 400 corresponds to an operating channel of a client station 154 (e.g., the client station 154-1). In other embodiments, the operating channel 400 is employed by a communication device (e.g., an AP or a client station) in a suitable communication network different from the WLAN 110. An operating channel such as the operating channel 400 that corresponds to an operating channel of an AP or a BSS supported by the AP is sometimes referred to herein as an "AP operating channel" or a "BSS operating channel." An operating channel such as the operating channel 400 that corresponds to an operating channel of a client station is sometimes referred to herein as an "STA operating channel."

The operating channel 400 includes a first channel segment 404 aggregated with a second channel segment 408. The first channel segment 404 has a first bandwidth and comprises a first number of component channels, and the second channel segment 408 has a second bandwidth and comprises a second number of component channels. In various embodiments, the first bandwidth of the first channel segment 404 and the second bandwidth of the second channel segment 408 are equal or are unequal. In various embodiments, the first number of component channels of the first channel segment 404 and the second number of composite channels of the second channel segment 408 are equal or are unequal.

In an embodiment, the first channel segment 404 and the second channel segment 408 are non-adjacent in frequency. For example, a gap in frequency exists between the first channel segment 404 and the second first channel segment 408. In various embodiments, the gap is at least 500 kHz, at least 1 MHz, at least 5 MHz, at least 20 MHz, etc. In another embodiment, the first channel segment 404 and the second channel segment 408 are adjacent in frequency. In this embodiment, there is no frequency gap between first channel segment 404 and the second channel segment 408.

In an example embodiment, the first channel segment 404 has a bandwidth of 80 MHz and the second channel segment 408 has a bandwidth of 80 MHz. In an embodiment in which the first channel segment 404 and the second channel segment 408 are not adjacent in frequency, the operating channel 400 is sometimes referred to as an 80+80 MHz channel. On the other hand, in an embodiment in which the first channel segment 404 and the second channel segment 408 are adjacent in frequency, the operating 400 is sometimes referred to as 160 MHz channel. In general, communication channels similar to the operating channel 400 in which the first channel segment and the second channel segment are not adjacent in frequency, the aggregate communication channel is referred to as (bandwidth of the first channel segment)+(bandwidth of the second channel segment) channel. On the other hand, communication channels similar to the operating channel 400 in which the first channel segment and the second channel segment are adjacent in frequency, or in which the second channel segment 408 is omitted (i.e., the second channel segment 408 has a bandwidth of 0 MHz), the aggregate communication channel 400 is referred to as (the sum of the first channel segment bandwidth and the second channel segment bandwidth) channel. In an embodiment, valid channel configurations of the aggregate communication channel 400 include: 20 MHz channel, 40 MHz channel, 60 MHz channel, 80 MHz channel, 100 MHz, 120 MHz channel, 140 MHz channel, channel 160 MHz channel, 20+40 MHz channel, 20+80 MHz channel, 40+80 MHz channel, and so on. In an embodiment, a respective bandwidth of each channel segment 404, 408 is selected from a set of possible channel bandwidths of 20 MHz, 40 MHz and 80 MHz. In other embodiments, other suitable sets of possible bandwidths are utilized.

The operating channel 400 includes multiple primary channels. For example, at least one component channel of the first channel segment 404 and at least one component channel of the second channel segment 408 is designated as a primary channel, in an embodiment. In the illustrated embodiment, a first component channel of the first channel segment 404 is designated as a first primary channel 412 and a second component channel of the second channel segment 408 is designated as a second primary channel 416. In some embodiments, the operating channel 400 includes more than two primary channels. For example, more than two component channels of the operating channel 400 are designated as primary channels, in some embodiments.

The operating channel 400 also includes secondary channels, in an embodiment. In an embodiment, each component channel of the first channel segment 404 that is not designated as a primary channel is designated as a secondary channel. Similarly, each component channel of the second channel segment 404 that is not designated as a primary channel is designated as a secondary channel, in an embodiment. In the illustrated embodiment, the first channel segment 404 includes three secondary channels 414 and the second communication channel segment 408 includes three secondary channels 420. In other embodiments, the first channel segment 404 and/or the second channel segment 408 includes another suitable number (e.g., 0, 1, 2, 4, 5, etc.) of secondary channels 414, 420. In some embodiments, the number of secondary channels 414 of the first channel segment 404 is not equal to the number of secondary channels 420 of the second channel segment 408.

FIG. 4B is a diagram of an example operating channel 450, according to an embodiment. In an embodiment, the operating channel 450 corresponds to an operating channel of the AP 114 of the WLAN 110 of FIG. 1, and the operating channel 450 is sometimes referred to herein as the "AP operating channel 450." In another embodiment, the operating channel 450 corresponds to an operating channel of a client station 154 (e.g., the client station 154-1) of the WLAN 110 of FIG. 1. In other embodiments, the operating channel 450 is employed by a communication device (e.g., an AP or a client station) in a suitable communication network different from the WLAN 110.

The operating channel 450 is generally the same as the operating channel 400 of FIG. 4A, except that whereas the operating channel 450 includes multiple primary channels as discussed above, the operating channel 450 includes a single primary channel. The operating channel 450 includes a first channel segment 454 aggregated with a second channel segment 458. The first channel segment 454 and the second channel segment 458 are generally the same as the first channel segment 404 and the second channel segment 408, respectively, of the operating channel 400 of FIG. 4A. The first channel segment 454 includes a component channel designated as a primary channel 452. The remaining component channels of the first channel segment 454 are secondary channels 454. The second channel segment 458 does not include a component channel designated as a primary channel. All component channels of the second channel segment 458 are secondary channels 462.

In an embodiment, legacy client stations that conform to the legacy protocol do not support operating channel with multiple primary channels. In some embodiments, to facilitate interoperability of the AP 114 with legacy client stations, the first communication protocol does not permit multiple primary channels in an AP operating channel when the AP operating channel is also supported by the legacy protocol. Accordingly, in an embodiment, the AP 114 is configured to operate with an AP operating channel (e.g., the AP operating channel 450 of FIG. 4B) that includes a single primary channel when the operating channel is also permitted by the legacy protocol, and to operate with an AP operating channel (e.g., the AP operating channel 400 of FIG. 4A) that includes multiple primary channels when the operating channel is not permitted by the legacy protocol. As an example, the AP 114 is configured to operate with an AP operating channel (e.g., the AP operating channel 450 of FIG. 4B) that includes a single primary channel when the operating channel is a 20 MHz channel, a 40 MHz channel, an 80 MHz channel, a 160 MHz channel or an 80+80 MHz channel, and to operate with an AP operating channel (e.g., the AP operating channel 400 of FIG. 4A) that includes multiple primary channels otherwise, such as when the operating channel is a 100 MHz channel, a 120 MHz channel, a 40+40 MHz channel, a 40+80 MHz channel, etc.

In some embodiments, an operating channel of a client station (e.g., the client station 154-1) has a bandwidth that is narrower than a bandwidth of an operating channel of the AP 114. In an embodiment, a client station 154 (e.g., the client station 154-1) operating with an operating channel that is narrower than an operating channel of the AP 114 is permitted to operate at any location within the operating channel of the AP 114. For example, the client station 154-1 is permitted to operate with an operating channel that does not cover a primary channel of the AP 114. In another embodiment, the client station 154 (e.g., the client station 154-1) operating with an operating channel that is narrower than an operating channel of the AP 114 is not permitted to operate with an operating channel that does not cover a primary channel of the AP 114. In this embodiment, an operating channel of the client station 154 (e.g., the client station 154-1) that is narrower than an operating channel of the AP 114 operates at a location within the operating channel of the AP 114 that covers at least one primary channel of the AP 114.

Figure 5:
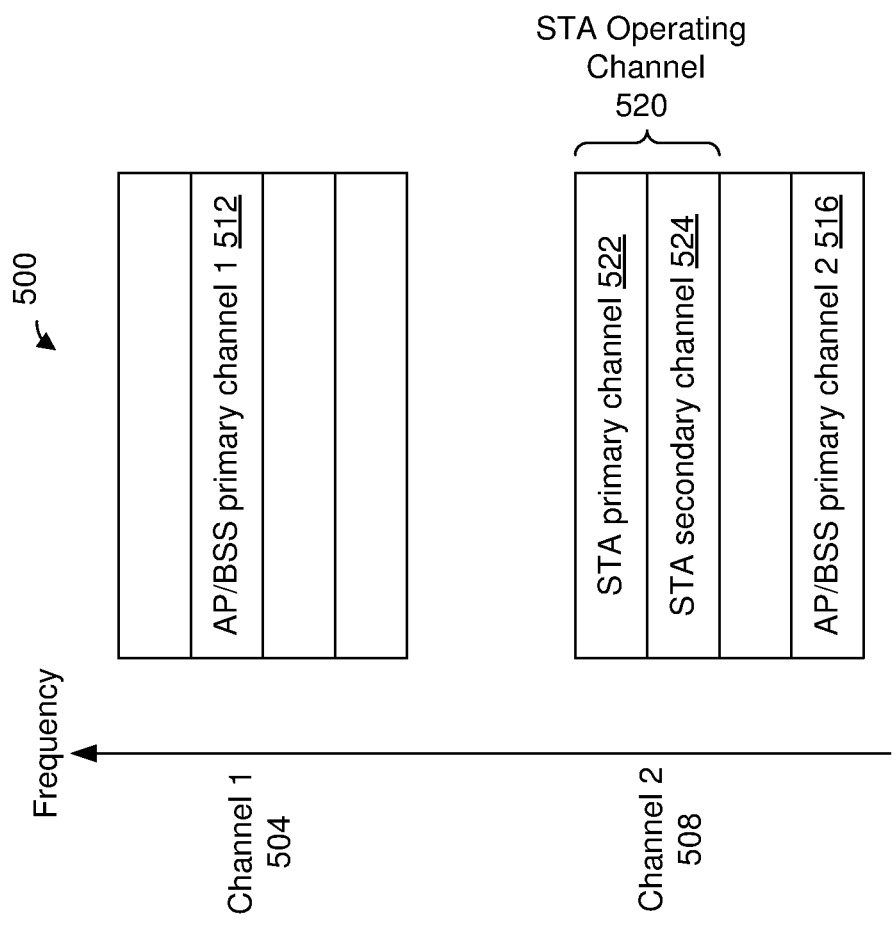
FIG. 5 is a block diagram of an example operating channel of an access point (AP) and an example operating channel of a client station (STA), according to an embodiment.

FIG. 5 is a block diagram illustrating an example operating channel 500 (sometimes referred to herein as "AP operating channel 500" or "BSS primary channel 500") of the AP 114 and an example operating channel 520 (sometime referred to herein as "STA operating channel 520") of a client station (e.g., the client station 154-1), according to an embodiment. The AP operating channel 500 corresponds to the operating channel 400 of FIG. 4A, in an embodiment. The AP operating channel 500 includes a first channel segment 504 corresponding to the first channel segment 404 of FIG. 4A aggregated with a second channel segment 508 corresponding to the second channel segment 408 of FIG. 4A, in an embodiment. The first channel segment 504 includes a first primary channel 512 and the second channel segment 508 includes a second primary channel 516. A primary channel of an AP operating channel is sometimes referred to herein as an "AP primary channel." Thus, for example, the first primary channel 512 of the AP operating channel 500 is sometimes referred to herein as an "the first AP primary channel 512," and the second primary channel 516 of the AP operating channel 500 is sometimes referred to herein as "the second AP primary channel 516."

In another embodiment, the AP operating channel 500 corresponds to the operating channel 450 of FIG. 4B. In this embodiment, the AP operating channel 500 includes a single AP primary channel. For example, one of the component channel 512 or the component channel 516 of the AP operating channel 500 is not designated as a primary channel and is instead used as a secondary channel, in an embodiment.

In the embodiment of FIG. 5, the STA operating channel 520 of the client station 154 is narrower than the AP operating channel 500 of the AP 114 and includes fewer component channels as compared to the number of component channels included in the AP operating channel 500 of the AP 114. In another embodiment, the STA operating channel 520 of the client station 154 spans the entire bandwidth of the AP operating channel 500 and includes the same number of component channels as the number of component channels of the AP operating channel 500.

In an embodiment in which the STA operating channel 520 of the client station 154 is narrower than the AP operating channel 500 of the AP 114, the client station 154 is permitted to operate such that the STA operating channel 520 does not span any AP primary channel of the AP operating channel 500. Accordingly, in an embodiment, the STA operating channel 520 spans one or more secondary channels of the AP operating channel 500 without spanning either the AP primary channel 512 or the AP primary channel 516 of the operating channel 500.

As will be described in more detail below, the location of the STA operating channel 520 of the client station 154 in the AP operating channel 500 of the AP 114 is established by an association procedure, a target wake time (TWT) session negotiation procedure, or another suitable procedure. Once the location of the STA operating channel 520 is established, the AP 114 transmits data units to the client station 154 in the STA operating channel 520 without transmitting any portion of the data units to the client station 154 in any primary channel of the AP operating channel 500, in an embodiment. The client station 154 receives data units from the AP 114 in the STA operating channel 520 without any portion of the data units transmitted to the client station 154 being in a primary channel of the AP operating channel 500, in an embodiment. Similarly, the client station 154 transmits data units to the AP 114 in the operating channel 520 without any portion of the data units transmitted by the client station 154 being in a primary channel of the operating channel 500. The AP 114 receives data units from the client station 154 in the STA operating channel 520 without any portion of the data units from the client station 154 being in any primary channel of the AP operating channel 500, in an embodiment.

In another in which the STA operating channel 520 of the client station 154 is narrower than the AP operating channel 500 of the AP 114, the client station 154 is not permitted to operate such that the STA operating channel 520 does not span any AP primary channel of the AP operating channel 500. Accordingly, the STA operating channel 520 of the client station 154 must include at least one of the first AP primary channel 512 or the second primary channel 516 of the AP operating channel 500, in this embodiment.

In some embodiments, a component channel of the STA operating channel 520 of the client station 154 is designated as a primary channel of the STA operating channel 520 (sometimes referred to herein as "STA primary channel"). In an embodiment, the client station 154 utilizes its designated STA primary channel as the primary channel during clear channel access (CCA) procedures for determining whether the client station 154 can initiate a transmission, such as an uplink (UL) OFDMA transmission, to the AP 114, for example. In an embodiment, the client station 154 utilizes its designated STA primary channel to set a counter, such as a network allocation vector (NAV) timer, for use in determining when the client station 154 can initiate a transmission. In other embodiments, the client station 154 utilizes its designated STA primary channel in other suitable manners.

In an embodiment, if the STA operating channel 520 spans at least one AP primary channel 512, 516, then at least one of the AP primary channels 512, 516 spun by the STA operating channel 520 is designated as the STA primary channel of the STA operating channel 520. On the other hand, if the STA operating channel 520 does not span any AP primary channel of the AP operating channel 500, then one of the component channels of the STA operating channel 520, that corresponds to a secondary channel of the AP operating channel 500, is designated as the STA primary channel of the STA operating channel 520. In the embodiment of FIG. 5, the operating channel 520 includes an STA primary channel 522 that coincides with a secondary channel of the AP operating channel 500. One or more component channels of the STA operating channel 520 not designated as the STA primary channel are designated as STA secondary channels, in an embodiment. For example, in addition to the STA primary channel 522, the operating channel 520 in FIG. 5 includes an STA secondary channel 524 that coincides with another secondary channel of the AP operating channel 500, in the illustrated embodiment.

In an embodiment, the client station 154 indicates to the AP 114 which particular component channel of the STA operating channel 520 is designated as the STA primary channel of the STA operating channel 520. In another embodiment, the AP 114 indicates to the client station 154 which particular component channel of the STA operating channel 520 is designated as the STA primary channel of the STA operating channel 520. In yet another embodiment, the particular component channel of the STA operating channel 520 is designated as the STA primary channel of the STA operating channel 520 is negotiated in a procedure (e.g., an association procedure, a TWT session setup procedure, etc.) conducted between the AP 114 and the client station 154.

In an embodiment, the AP 114 is configured to announce parameters of its operating channel (e.g., channel bandwidth, channel configuration information such as whether the channel is contiguous or includes channel segments that are not contiguous, one or more primary channel, etc.), to client stations 154 to enable the client stations 154 to associate and establish communication with the AP 114 and to subsequently operate in the BSS served by the AP 114, for example. The AP 114 announces parameters of its operating channel by including one or more operating information elements in one or more MAC data units (e.g., beacon data units) transmitted by the AP 114. The number and types of the one or operating information elements included in a MAC data unit for announcing parameters of an AP operating channel depend on whether or not the AP operating channel conforms to the legacy communication protocol (e.g., whether or not the channel bandwidth is supported by the legacy communication protocol), in an embodiment. In some embodiments, the number and types of the one or operating information elements included in a MAC data unit for announcing parameters of an AP operating channel depends on whether the AP operating channel includes multiple primary channels or includes a single operating channel.

Figure 6:
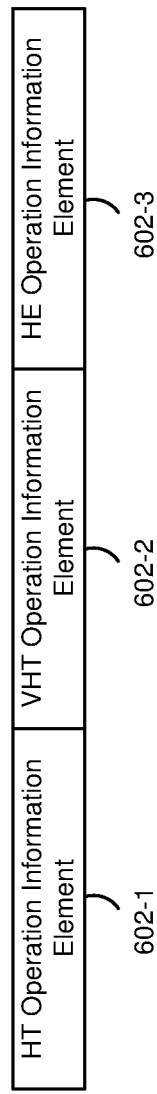
FIG. 6 is a block diagram of a portion of a medium access control layer (MAC) data unit for signaling parameters of an operating channel, according to an embodiment.

FIG. 6 is a block diagram of a portion of a MAC data unit 600 that includes one or more operation information elements 602 for signaling parameters of an AP operating channel, according to an embodiment. In an embodiment, the AP 114 transmits the MAC data unit 600 to announce parameters of an AP operating channel that conforms to the legacy communication protocol. The operation information elements 602 are the same as or similar to operation information elements defined by the legacy communication protocol. The operation information elements 602 include an HT operation information element 602-1, a VHT operation element 602-2 and an HE operation information element 602-3 as defined by the IEEE 802.11n Standard, the IEEE 802.11ac Standard and/or the IEEE 802.11ax Standard, in an embodiment. In an embodiment, the AP 114 generates the HT operation information element 602-1, the VHT operation element 602-2 and/or the HE operation information element 602-3, for inclusion in the MAC data unit 600, as needed depending on the particular operating channel and the particular parameters being announced, as defined by the IEEE 802.11n Standard, the IEEE 802.11ac Standard and/or the IEEE 802.11ax Standard.

In an embodiment, the AP 114 generates and transmits the MAC data unit 600 to announce parameters of an AP operating channel when the AP operating channels includes a single primary channel and is a 20 MHz channel, a 40 MHz channel, an 80 MHz channel, a 160 MHz channel, or an 80+80 MHz channel. The operating information elements 602 of the MAC data unit 600 indicate the bandwidth of the operating channel and the primary channel of the operating channel, in an embodiment. In the case of 80+80 MHz channel, the operating information elements 602 of the MAC data unit 600 additionally indicate a first center frequency of the first 80 MHz channel segment of the operating channel and a second center frequency of the second 80 MHz channel segment of the operating channel, in an embodiment. In some embodiments, the operating information elements 602 additionally indicate other parameters of the operation channel, such as MCSs that can be used in the operating channel, number of spatial streams (NSS) that can be used in the operation channel, etc.

In an embodiment, to announce an AP operating channel (e.g., the operating channel 400 of FIG. 4A) that includes respective primary channels in each of multiple channel segments of the AP operating channel, the AP 114 generates and transmits a first MAC data unit (e.g., a first beacon data unit) such as the MAC data unit 600 in a first channel segment of the operating channel, to announce parameters (e.g., channel bandwidth, primary channel, etc.) corresponding to the first channel segment, and also generates and transmits a second MAC data unit (e.g., a second beacon data unit) such as the MAC data unit 600 in a second channel segment of the operating channel, to announce parameters (e.g., channel bandwidth, primary channel, etc.) corresponding to the second channel segment. For example, to announce a 40+80 MHz channel with a first primary channel designated in the 40 MHz channel segment and a second primary channel designated in the 80 MHz channel segment, the AP 114 generate and transmits a first MAC data unit 600 to indicate the 40 MHz bandwidth and the first primary channel of the 40 MHz channel and also generates and transmits a second MAC data unit 600 to indicate the 80 MHz bandwidth and the second primary channel of the 80 MHz channel segment. In an embodiment, the AP 114 synchronously transmits the first MAC data unit 600 in the first primary channel of the first channel segment and the second MAC data unit 600 in the second primary channel of the second channel segment. In an embodiment, each of i) the first MAC data unit 600 transmitted in the first primary channel of the first channel segment and ii) the second MAC data unit 600 transmitted in the second primary channel of the second channel segment includes a same indicator (e.g., a same BSSID) of the WLAN 110 corresponding to the AP 114.

Figure 7:
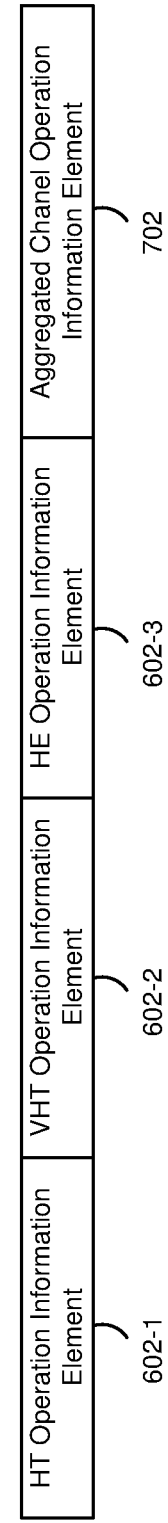
FIG. 7 is a block diagram of a portion of a MAC data unit for signaling parameters of an operating channel, according to another embodiment.

FIG. 7 is a block diagram of a portion of a MAC data unit 700 that includes one or more operation information elements 702 for signaling parameters of an AP operating channel, according to an embodiment. In an embodiment, the AP 114 transmits the MAC data unit 700 to announce parameters of an AP operating channel that does not conform to the legacy wireless communication protocol. In an embodiment, the AP 114 transmits the MAC data unit 700 to announce parameters of an AP operating channel that does not conform to the legacy communication protocol and includes a single primary channel. For example, the AP 114 generates and transmits the MAC data unit 700 to announce parameters of an AP operating channel when the AP operating channel includes a single primary channel and is a 100 MHz channel, a 120 MHz channel, a 40+40 MHz channel, a 40+80 MHz channel, etc.

The MAC data unit 700 includes the one or more operation information elements 602 as discussed above. The one or more operation information elements 602 in the MAC data unit 700 indicate parameters corresponding to a first channel segment of the operating channel. In an embodiment, the one or more operation information elements 602 indicate parameters corresponding to the single primary channel of the operating channel. The MAC data unit 700 additionally includes an aggregated channel operation information element 702. In an embodiment, the aggregated channel operation information element 702 indicates parameters corresponding to a second channel segment of the operating channel. In an embodiment, the aggregated channel operation information element 702 indicates parameters corresponding to the channel segment that does not include a primary channel.

In an embodiment, the AP 114 is configured to update one or more parameters of an AP operating channel of the AP 114 during operation of the AP 114. For example, the AP 114 is configured to update the bandwidth of the AP operating channel during operation of the AP 114. In various embodiments, the AP 114 is configured to reduce or increase the bandwidth of the operating channel according to channel capacity needs of the client stations 154 served by the AP 114, types of client stations 154 served by the AP 114, capabilities of the client stations 154 served by the AP 114, operating channel of the client stations 154 served by the AP 114, etc. As just an example, in an embodiment, the AP 114 operating with an 80+80 MHz operating channel updates the channel bandwidth to 80 MHz by eliminating one of the 80 MHz channel segments. As just another example, in an embodiment, the AP 114 operating with a contiguous 120 MHz operating channel formed by an 80 MHz channel segment and an adjacent 40 MHz channel segment, updates the channel bandwidth to a 40+20 MHz channel by reducing the bandwidth of the 80 MHz channel segment to 40 MHz and reducing the bandwidth of the 40 MHz channel segment to 20 MHz.

In an embodiment, the AP 114 generates and transmits a MAC data unit (sometimes referred to herein as a "channel update MAC data unit"), such as an operating mode notification frame, to indicate to client stations 154 that the AP 114 is updating one or more parameters of the AP operation channel of the AP 114, and to signal the new parameters of the updated AP operating channel of the AP 114. In an embodiment, when the AP operating channel of the AP 114 before being updated and the updated AP operating channel after being updated each corresponds to an operating channel supported by the legacy communication protocol, the AP 114 includes, in the channel update MAC data unit, one or more operating mode fields defined for changing operating channel parameters by the legacy communication protocol. For example, in an embodiment, the AP 114 includes, in the channel update MAC data unit, a VHT Operating mode field and/or an HE operating mode (OM) control subfield defined by the legacy communication protocol, to indicate the parameters of the updated AP operating channel. On the other hand, when the AP operating channel, before being updated by the AP 114 and/or after being updated by the AP 114, corresponds to an operating channel not supported by the legacy communication protocol, the AP 114 includes, in the channel update channel update MAC data unit, an enhanced operating mode field defined by the first communication protocol.

In some situations, a client station 154 (e.g., the client station 154-1) updates one or more parameters of an STA operating channel of the client station 154 during operation of the client station 154. For example, the client station 154 updates the STA operating channel parameters to reduce or increase the bandwidth of the STA operating channel according to channel capacity needs of the client stations 154 an/or to conserve power, in an embodiment. As another example, the client station 154 switches its operating channel to another location in the AP operating channel of the AP 114, the other location having better channel characteristics, to improve performance. In such situations, the client station 154 signals new parameters of the STA operating channel to the AP 114 and/or renegotiates parameters of the STA operating channel with the AP 114, in an embodiment. In an embodiment, to signal new parameters of the STA operating channel to the AP 114 and/or renegotiate parameters of the STA operating channel with the AP 114, the client station 154 transmits a suitable MAC data unit (e.g., a channel update MAC data unit, a channel switch MAC data unit, channel switch request MAC data unit, a target wake time (TWT) request data unit, etc.) that includes a VHT Operating mode field, an HE operating mode (OM) control subfield and/or an enhanced operating mode field 800, to the AP 114. In various embodiment, the suitable MAC data unit transmitted by the client station 154 indicates STA operating channel parameters that the client station 154 is indicating to and/or is requesting from the AP 114. When the STA channel update is performed by negotiation, the AP 114 responds with a response MAC data unit (e.g., channel switch response data unit, TWT response data unit, etc.) that indicates that the requested STA operating channel parameters are accepted, or indicates other STA operating channel parameters to be used, for example.

Figure 8:
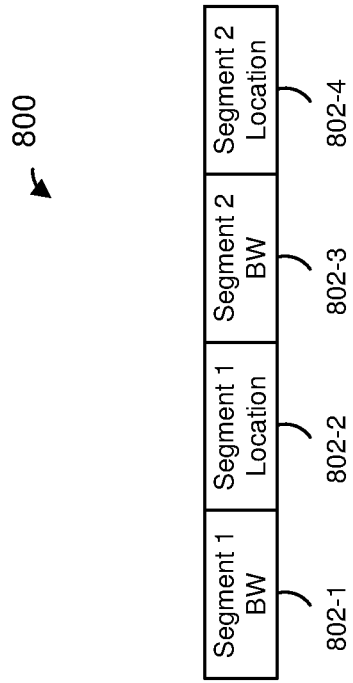
FIG. 8 is a diagram of an enhanced operating mode field, according to an embodiment.

FIG. 8 is a diagram of an enhanced operating mode field 800, according to an embodiment. The enhanced operating mode field 800 is included in a channel update MAC data unit, according to an embodiment. In another embodiment, the enhanced operating mode field 800 is included in another suitable MAC data unit transmitted by a communication device (e.g., the AP 114 or a client station 154) to announce, negotiate or update parameters of the operating channel of the communication device. The enhanced operating mode field 800 includes a first channel segment bandwidth subfield 802-1 and a first segment location subfield 802-2 to indicate, respectively, the new channel bandwidth of the first channel segment of the operating channel being updated and the new location of the first channel segment of the operating channel being updated. The enhanced operating mode field 800 also includes a second channel segment bandwidth subfield 802-3 and a second segment location subfield 802-4 to indicate, respectively, the channel bandwidth of the second channel segment of the updated operating channel and new location of the second channel segment of the updated operating channel. In some embodiments, the enhanced operating mode field 800 includes one or more additional subfields 802 not illustrated in FIG. 8. For example, the enhanced operating mode field 800 includes one or more subfields 802 to indicate one or more primary channels of the updated operating channel, in an embodiment. As another example, the enhanced operating mode field 800 includes respective subfields 802 to indicate the number of spatial streams (NSS) supported in each of the first channel segment and the second channel segment of the updated AP operating channel. In some embodiments, the enhanced operating mode field 800 omits some of the subfields 802 illustrated in FIG. 8. For example, the enhanced operating mode field 800 omits the location subfields 802-2, 802-4, in some embodiments.

Figure 9:
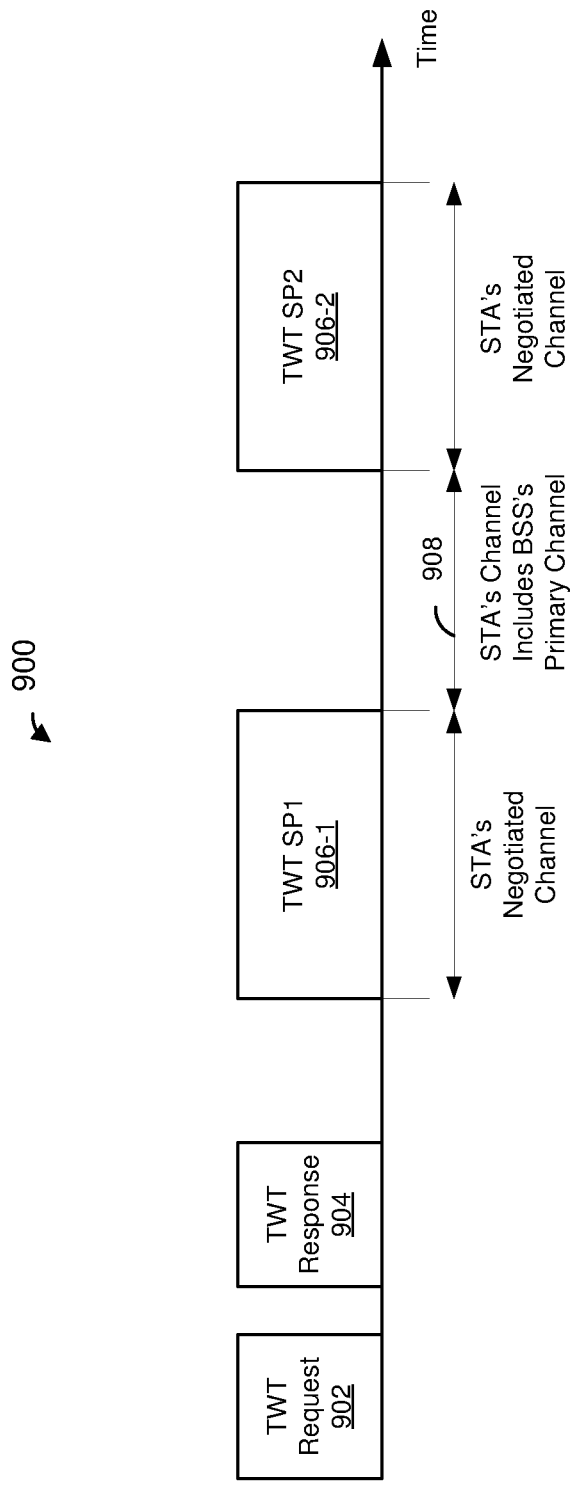
FIG. 9 is a diagram of a target wake time (TWT) session, according to an embodiment.

FIG. 9 is a diagram of a target wake time (TWT) session 900 between the AP 114 and a client station 154 (e.g., the client station 154), according to an embodiment. In an embodiment, according to the first communication protocol, the operating channel of the client station 154 must include at least one primary channel of the operating channel of the AP 114 during an association procedure conducted between the client station 154 and the AP 114. After association between the client station 154 and the AP 114 is established, the TWT session 900 may be conducted, in an embodiment. To initiate the TWT session 900 with the AP 114, in an embodiment, the client station 154 transmits a TWT request data unit (e.g., MAC data unit or frame) 902 to the AP 114. In response to receiving the TWT request data unit 900, the AP 114 transmits a TWT response data unit 904 to the client station 154. The TWT request data unit 902 and the TWT response data unit 904 include respective information elements (e.g., TWT elements) to negotiate/indicate parameters of the TWT session 900, in an embodiment. The parameters negotiated/indicated by the TWT request data unit 902 and the TWT response data unit 904 include i) a start time of a first individual TWT scheduled period (SP) 906-1 scheduled for transmission of data from the AP 114 to the client station 154 and/or from the client station 154 to the AP 114 and ii) a TWT interval that defines times at which subsequent one or more TWT SP, such as a second TWT SP 906-2, during the TWT session 900 will occur. At least one of the TWT request data unit 902 and the TWT response data unit 904 also includes indications of STA operating channel parameters (e.g., channel bandwidth, channel location, primary channel, etc.) being indicated or negotiated for use during the TWT session 900, in an embodiment.

During one or more time periods between the TWT SPs 906, such as during a time period 908 between the first TWT SP 906-1 and the second TWT SP 906-2 of the TWT session 900, the client station 154 is permitted to operate in power save mode. In an embodiment, during operation in power save mode, the client station 154 may transmit a MAC data unit (sometimes referred to herein as "polling MAC data unit"), such as a power save poll (PS-poll) frame or a quality of service (QoS) Null frame, to signal to the AP 114 that the client station 154 has entered active mode and/or to request the AP 114 transmit data that the AP 114 queued for the client station 154 during the power save mode of the client station 154.

In an embodiment, during operation in the TWT SPs 906, the client station operates with an STA operating channel that does not include any primary channel of the operating channel of the AP 114, as negotiated for the TWT session 900. In an embodiment, during the TWT SPs 906, the AP 114 transmits data units to and/or receives data units from the client station 154 in the STA operating channel that does not include any primary channel of the operating channel of the AP 114. In an embodiment, during the TWT SPs 906, the client station 154 transmits data units to and/or receives data units from the AP 114 in the STA operating channel that does not include any primary channel of the operating channel of the AP 114.

On the other hand, during the time period 908 of the TWT session 900, when the client station 154 is operating in power save mode, communication between the client station 154 and the AP 114, if any, occurs in an STA operating channel of the client station 154 that includes at least one primary channel of the operating channel of the AP 114, in an embodiment. For example, during the time period 908, the client station 154 transmits a polling MAC data unit to the AP 114 in the STA operating channel that includes at least one primary channel of the operating channel of the AP 114. In response to receiving a polling MAC data unit from the client station 154, the AP transmits one or more data units, that include queued data for the client station 154, to the client station 154 in the STA operating channel that includes at least one primary channel of the operating channel of the AP 114, in an embodiment. In an embodiment, the client station 154 receives, in the STA operating channel that includes at least one primary channel of the operating channel of the AP 114, one or more data units transmitted to the client station 154 in response to a polling MAC data unit from the client station 154.

In an embodiment, in some situations, the client station 154 updates parameters of the STA operating channel negotiated for the TWT session 900 and/or switches to a new STA operating channel. In some embodiments, to update the STA operating channel parameters negotiated for the TWT session 900 and/or to switch to a new STA operating channel, the client station 154 initiates a renegotiation of the TWT session 900 with the AP 114, for example by transmitting a TWT request data unit to the AP 114, or by transmitting another suitable data unit to indicate the parameters of the updated STA operating channel to the AP 114. The TWT request data unit or other MAC data unit includes a VHT Operating mode field, an HE operating mode (OM) control subfield and/or an enhanced operating mode field (e.g., the field 800 of FIG. 8) to indicate the parameters of the updated STA operating channel, as described above, in an embodiment. After renegotiation, the client station 154 and the AP 114 communicate with each other using the updated STA operating channel of the client station 154 during TWT SPs of the TWT session 900, or during TWT SPs renegotiated between the client station 154 and the AP 114, in various embodiments.

In some situations, for example when i) the STA operating channel of client station 154 includes an STA primary channel and ii) the STA does not wish to update the STA primary channel, the client station 154 signals an update to the STA operating channel without renegotiation of the TWT session 900. For example, in an embodiment, the client station 154 signals an update to the STA operating channel by transmission of a channel update MAC data unit that includes a VHT Operating mode field, an HE operating mode (OM) control subfield and/or an enhanced operating mode field (e.g., the field 800 of FIG. 8) to indicate the parameters of the updated STA operating channel, during the TWT session 900 and without renegotiating the TWT session 900, in an embodiment. After transmission of the channel update MAC data unit, the client station 154 and the AP 114 communicate with each other during the TWT SPs of the TWT session 900 using the updated STA operating channel of the client station 154 as indicated in the channel update MAC data unit, in an embodiment.

Figure 10:
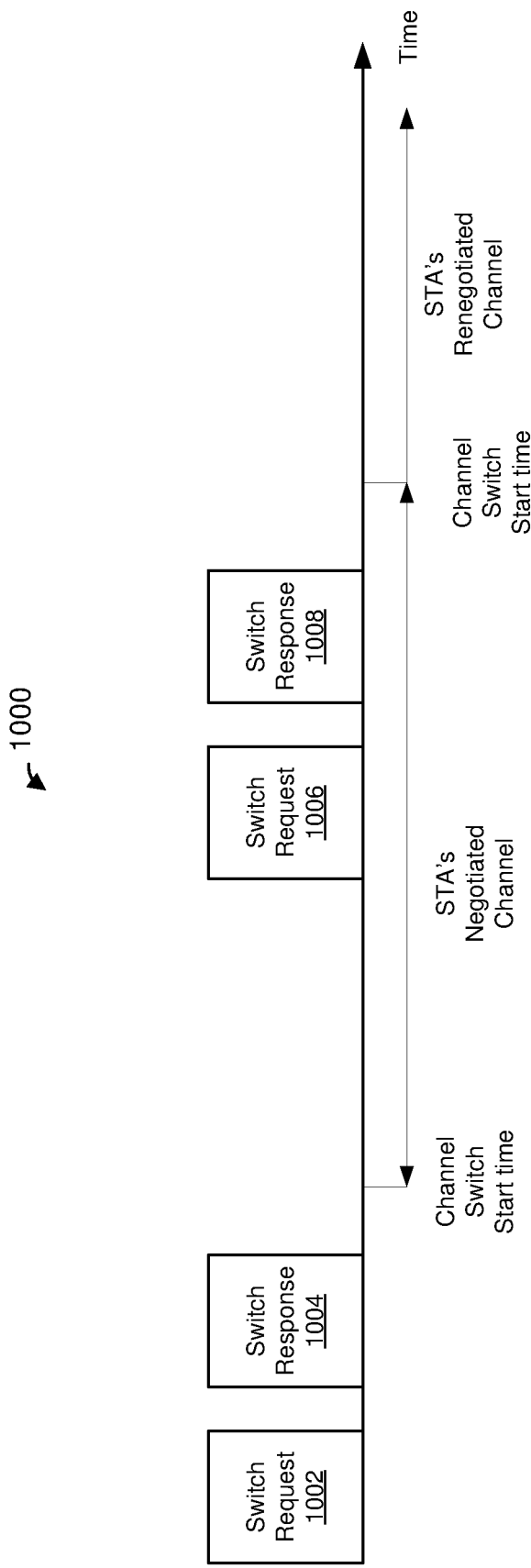
FIG. 10 is a diagram of a channel switch procedure for updating an operating channel of a client station, according to an embodiment.

FIG. 10 is a diagram of a channel switch procedure 1000 for updating an STA operating channel of a client station 154 (e.g., the client station 154-1), according to an embodiment. The channel switch procedure 1000 is utilized to update an STA operating channel in situations other than during a TWT session, for example, in an embodiment. In an embodiment, the client station 154 transmits a channel switch request MAC data unit 1002 to the AP 114. In response to receiving the channel switch request MAC data unit 1002, the AP 114 transmits a channel switch response MAC data unit 1004 to the client station 154. The channel switch request MAC data unit 1002 and the channel switch response MAC data unit 1004 include respective information elements to negotiate/indicate STA operating channel parameters, in an embodiment. The parameters negotiated/indicated by the channel switch request MAC data unit 1002 and the channel switch response MAC data unit 1004 include a channel switch start time, in an embodiment. At least one of the channel switch request MAC data unit 1002 and the channel switch response MAC data unit 1004 also includes indications of STA operating channel parameters (e.g., channel bandwidth, channel location, primary channel, etc.) being indicated/negotiated for operation of the client station 154, in an embodiment. The STA operating channel parameters define an STA operating channel that does not include any primary channel of the AP operating channel of the AP 114, in an embodiment. In an embodiment, the STA operating channel parameters define an STA primary channel that coincides with a secondary channel of the AP operating channel of the AP 114.

Beginning at the negotiated channel switch start time, the AP 114 and the client station 154 are permitted to begin communicating with each other using the STA operating channel parameters indicated/negotiated by the channel switch request MAC data unit 1002 and the channel switch response MAC data unit 1004, in an embodiment. During operation, in some situations, the client station 154 updates parameters of the negotiated STA operating channel parameters and/or switches to a new STA operation channel location within the AP operation channel of the AP 114. In some embodiments, to update the negotiated STA operating channel parameters and/or to switch to a new STA operating channel, the client station 154 initiates a renegotiation by transmitting a channel switch request MAC data unit request data unit 1006 to the AP 114. The channel switch request MAC data unit 1006 includes a VHT Operating mode field, an HE operating mode (OM) control subfield and/or an enhanced operating mode field (e.g., the field 800 of FIG. 8) to indicate the parameters of the updated STA operating channel, as described above, in an embodiment. In response, the AP 114 transmits a channel switch response MAC data unit 1006 to the client station 154. The channel switch response MAC data unit 1006 indicates that the requested STA operating channel parameters are accepted, or indicates other STA operating channel parameters to be used, in an embodiment. The parameters negotiated/indicated by the channel switch request MAC data unit 1006 and the channel switch response MAC data unit 1008 include a new channel switch start time, in an embodiment. After renegotiation, the client station 154 and the AP 114 communicate with each other using the updated STA operating channel of the client station 154 beginning at the new channel switch start time, in an embodiment.

Figure 11:
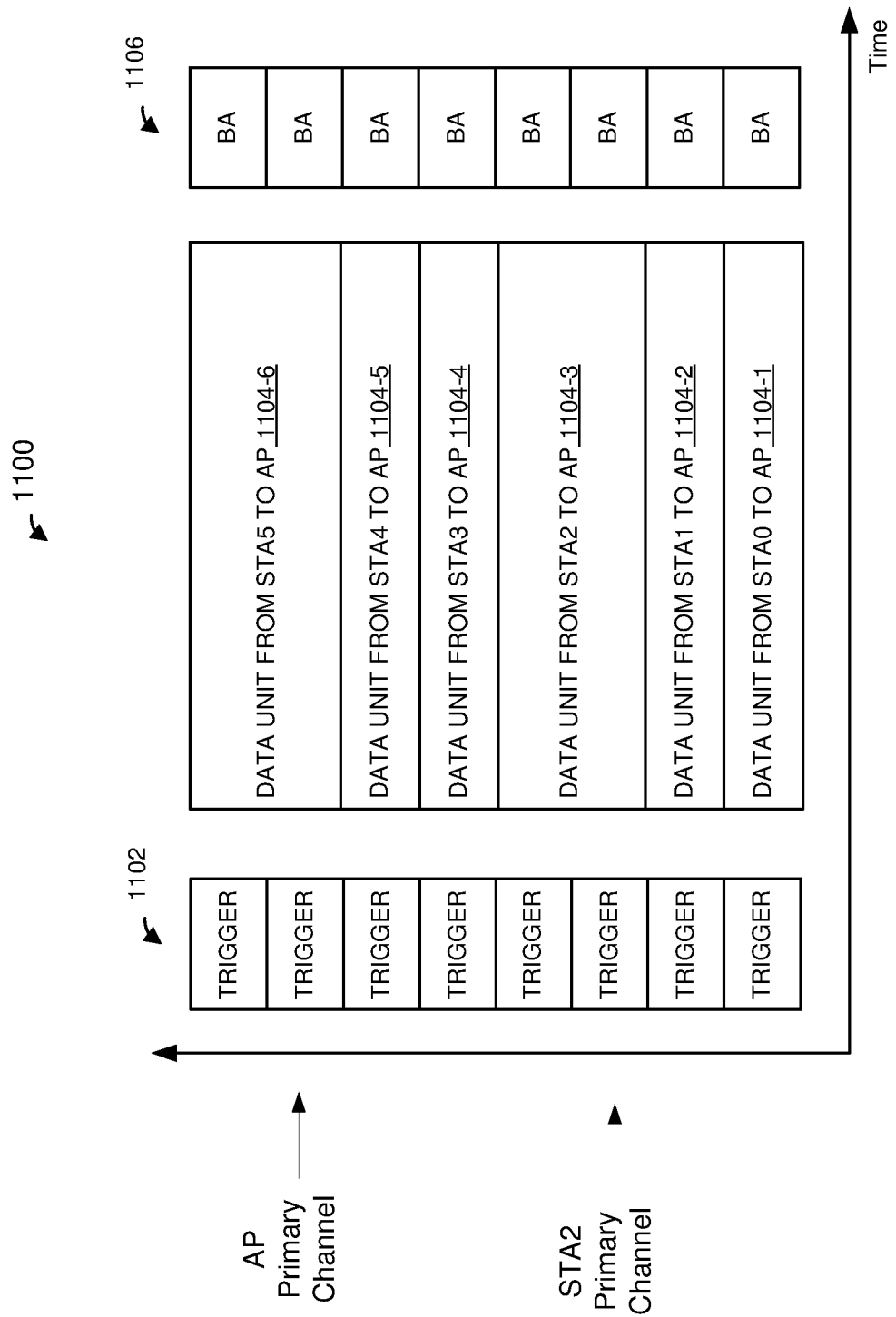
FIG. 11 is a block diagram of a frame exchange between an AP and a plurality of client stations (STAs), according to an embodiment.

As discussed above, in some embodiments, the AP 114 and a plurality of client stations 154 are configured for MU communication using OFDMA transmissions. FIG. 11 is a block diagram of a frame exchange 1110 between the AP 114 and a plurality of client stations 154, according to an embodiment. The AP 114 generates and transmits a trigger frame 1102 to trigger uplink OFDMA transmission to the AP 114 from multiple client stations 154. The trigger frame 1102 includes allocation information that indicates respective parameters, such as RU allocation, for uplink OFDMA transmission by the client stations 154. The AP 114 transmits the trigger frame 1102 as part of a downlink OFDMA transmission to the client stations 154, in an embodiment. In another embodiment, the AP 114 transmits the trigger frame 1102 as an independent MAC frame to the client stations 154. The independent MAC frame is transmitted on duplicate mode where the trigger frame 1102 is duplicated in each component (e.g., component 20 MHz) channel, in an embodiment. In an embodiment, the trigger frame 1102 includes user-specific information indicating, for example RU allocation, for a client station 154 that is operating with an STA operating channel that does not include a primary channel of the AP operating channel of the AP 114. In an embodiment in which i) STA operating channel of a client station 154 spans multiple secondary channels of the operating channel of the AP 114 and ii) no STA primary channel is designated, the AP 114 includes user-specific information for the client station 154 in each of the multiple secondary channels spun by the client station 154. On the other hand, in an embodiment in which i) STA operating channel of a client station 154 spans multiple AP secondary channels of the operating channel of the AP 114 and ii) an STA primary channel is designated, the AP 114 includes user-specific information for the client station 154 in the designated STA primary channel of the operating channel of the multiple AP secondary channels spun by the client station 154 without including the user-specific information in the one or more secondary STA channels of the STA operating channel of the client station 154.

In response to receiving the trigger frame 1102 and determining, based om the user-specific information included in the trigger frame 1102, RUs allocated to the client station 154, each client station 154 that is triggered by the trigger frame 1106 and is able to transmit in the RU allocated to the client station 154, transmits a respective uplink data unit 1104 as part of the triggered OFDMA transmission to the AP 114, in an embodiment.

In response to receiving the OFDMA transmission that includes the respective data units 1104 transmitted by the triggered client stations 154, the AP 114 transmits an acknowledgement frame 1106 to the client stations 154. The acknowledgement frame 1106 includes respective acknowledgements (e.g., Acks or Block Acks (BAs)) for respective ones of the client stations 154. In an embodiment in which i) STA operating channel of a client station 154 spans multiple secondary channels of the operating channel of the AP 114 and ii) no STA primary channel is designated, the AP 114 includes the Ack or BA for the client station 154 in the acknowledgement frame 1106 in each of the multiple secondary channels of the operating channel of the AP 114 spun by the operating channel of the client station 154. On the other hand, in an embodiment in which i) STA operating channel of a client station 154 spans multiple AP secondary channels of the operating channel of the AP 114 and ii) an STA primary channel is designated, the AP 114 includes the Ack or BA for the client station 154 in the acknowledgement frame 1106 in the primary channel of the operating channel of the client station 154 without including the Ack or BA information for the client station 154 in the one or more secondary STA channels of the STA operating channel of the client station 154.

Figure 12:
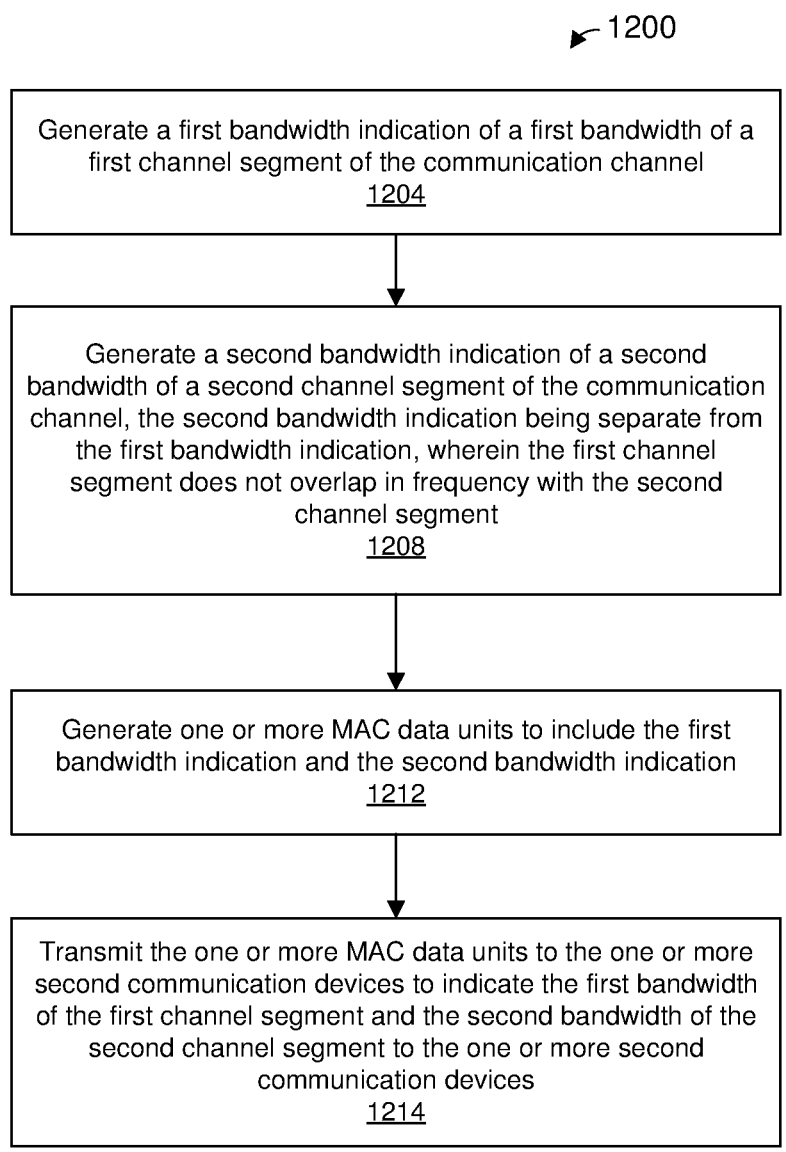
FIG. 12 is a flow diagram of an example method for operation of a first communication device in a communication channel between the first communication device and one or more second communication devices, according to an embodiment.

FIG. 12 is a flow diagram of an example method 1200 for operation of a first communication device in a communication channel between the first communication device and one or more second communication devices, according to an embodiment. In some embodiments, the AP 114 of FIG. 1 is configured to implement the method 1200. In an embodiment, the method 1200 is implemented by the AP 114 by utilizing the system architecture 300 of FIG. 3A or the system architecture or the system architecture 350 of FIG. 3B. The method 1200 is described, however, in the context of the AP 114 merely for explanatory purposes and, in other embodiments, the method 1200 is implemented by another suitable device of the WLAN 110 of FIG. 1 or by a communication device operating in a suitable network different from the WLAN 110 of FIG. 1.

At block 1202, a first bandwidth indication of a first bandwidth of a first channel segment of the communication channel is generated by the first communication device. In an embodiment, the AP 114 generates the first bandwidth indication. In another embodiment, the first bandwidth indication is generated by a suitable communication device different from the AP 114. In an embodiment, the first bandwidth indication indicates a bandwidth of the first channel segment 404 of the operating channel 400 of FIG. 4A. In another embodiment, the first bandwidth indication indicates a bandwidth of the first channel segment 454 of the operating channel 450 of FIG. 4B. In other embodiments, the first bandwidth indication indicates other suitable bandwidths.

At block 1204, a second bandwidth indication of a second bandwidth of a second channel segment of the communication channel is generated by the first communication device. In an embodiment, the AP 114 generates the second bandwidth indication. In another embodiment, the second bandwidth is generated by a suitable communication device different from the AP 114. In an embodiment, the second bandwidth indication indicates a bandwidth of the second channel segment 408 of the operating channel 400 of FIG. 4A. In another embodiment, the second bandwidth indication indicates a bandwidth of the second channel segment 458 of the operating channel 450 of FIG. 4B. In other embodiments, the second bandwidth indication indicates other suitable bandwidths. In an embodiment, the second bandwidth indicated by the second bandwidth indication generated at block 1204 is different from the bandwidth indicated by the bandwidth indication indicated by the first bandwidth indication generated at block 1202. In another embodiment, the second bandwidth indicated by the second bandwidth indication generate at block 1204 is the same as the bandwidth indicated by the bandwidth indication indicated by the first bandwidth indication generated at block 1202. In an embodiment, the second channels segment does not overlap in frequency with the first channel segment. In an embodiment, the second channel segment and the first channel segment are contiguous. In another embodiment, the second channel segment and the first channel segment are non-contiguous.

At block 1206, one or more MAC data units are generated by the first communication device. In an embodiment, the AP 114 generates the one or more MAC data units. In another embodiment, a suitable communication different from the AP 114 generates the one or more MAC data units. The one or more MAC data units are generated to include the first bandwidth indication generated at block 1202 and the second bandwidth indication generated at block 1204. In an embodiment, one or more MAC data units 600 of FIG. 6 are generated. In another embodiment, the MAC data unit 700 of FIG. 7B is generated. In other embodiments, other suitable MAC data units are generated.

At block 1208, the one or more MAC data units generated at block 1206 are transmitted by the first communication device to the one or more second communication devices. In an embodiment, the AP 114 transmits the one or more MAC data units to one or more client stations 154. In another embodiment, a suitable communication different from the AP 114 transmits the one or more MAC data units or the AP 114 transmits the one or more MAC data units to one or more second communication devices different from the client stations 154. The one or more MAC data units indicate the first bandwidth of the first channel segment and the second bandwidth of the second channel segment to the one or more second communication devices, in an embodiment.

In an embodiment, a method for operation of a first communication device in a communication channel between the first communication device and one or more second communication devices includes: generating, at a network interface of the first communication device, a first bandwidth indication of a first bandwidth of a first channel segment of the communication channel; generating, at the network interface device, a second bandwidth indication of a second bandwidth of a second channel segment of the communication channel, the second bandwidth indication being separate from the first bandwidth indication, wherein the first channel segment does not overlap in frequency with the second channel segment; generating, at the network interface device, one or more media access control protocol (MAC) data units to include the first bandwidth indication and the second bandwidth indication; and transmitting, with the network interface device, the one or more MAC data units to the one or more second communication devices to indicate the first bandwidth of the first channel segment and the second bandwidth of the second channel segment to the one or more second communication devices.

In other embodiments, the method includes one of, or any suitable combination of two or more of, the following features.

The first bandwidth of the first channel segment is different from the second bandwidth of the second channel segment.

The network interface device of the first communication device includes i) a first radio frequency (RF) radio configured for operation in the first channel segment and not in the second channel segment and ii) a second RF radio configured for operation in the second channel segment and not the first channel segment.

Generating the one or more MAC data units to include the first bandwidth indication and the second bandwidth indication comprises generating i) a first MAC data unit to include the first bandwidth indication and ii) a second MAC data unit to include the second bandwidth indication.

Transmitting the one or more MAC data units comprises: transmitting, via the first RF radio in the first channel segment, the first MAC data unit that includes the first bandwidth indication of the first bandwidth of the first channel segment, and transmitting, via the second RF radio in the second channel segment, the second MAC data unit that includes the second bandwidth indication of the second bandwidth of the second channel segment.

Transmission of the first MAC data unit in the first channel segment is synchronized with transmission of the second MAC data unit in the second channel bandwidth.

Generating the one or more MAC data units comprises generating a single MAC data unit to include both the first bandwidth indication of the first bandwidth of the first channel segment and the second bandwidth indication of the second bandwidth of the second channel segment.

Transmitting the one or more MAC data units comprises one of i) transmitting the single data in the first channel segment without transmitting the MAC data unit in the second channel segment or i) transmitting the single data in the second channel segment without transmitting the MAC data unit in the first channel segment.

The first channel segment comprises a first plurality of component channels including a first primary channel and one or more first secondary channels.

The second channel segment comprises a second plurality of component channels including a second primary channel and one or more second secondary channels.

Generating the one or more MAC data units comprises generating the one or more MAC data units to further include i) a first primary channel indication indicating a first location, in the first channel segment, of the first primary channel and ii) a second primary channel indication indicating a second location, in the second channel segment, of the second primary channel.

The method further includes: receiving, at the network interface device of the first communication device, an indication of an operating channel of a particular second communication device of one or more second communication devices, wherein the operating channel of the particular second communication device i) does not include any primary channel of the operating channel of the first communication device and ii) spans multiple secondary channels of the operating channel of the first communication device; and transmitting, with the network interface device of the first communication device, a physical layer protocol data units (PPDU) to the particular second communication device, wherein the PPDU i) does not span any primary channel of the operating channel of the first communication device and ii) spans multiple secondary channels of the operating channel of the first communication device.

After transmitting the one or more MAC data units to the one or more second communication devices, updating, with the network interface device of the first communication device, one or both of i) the first bandwidth of the first channel segment of the operating channel of the first communication device and ii) the second bandwidth of the second channel segment of the operating channel of the first communication device for subsequent operation, including: generating an additional MAC data unit to include to include a third bandwidth indication indicating a third bandwidth of the first segment field and a fourth bandwidth indication indicating a fourth bandwidth of the second channel bandwidth, and transmitting the additional MAC data unit to the one or more second communication devices to indicate to the one or more second communication devices that i) the bandwidth of the first segment channel is updated from the first bandwidth to the third bandwidth and ii) the bandwidth of the second segment channel is updated from the second bandwidth to the fourth bandwidth.

The third bandwidth is the same as the first bandwidth and the fourth bandwidth is different from the second bandwidth.

The third bandwidth is different from the first bandwidth and the fourth bandwidth is the same as the second bandwidth, and The third bandwidth is the different from the first bandwidth and the fourth bandwidth is the different from the second bandwidth.

In another embodiment, a first communication device configured for communication with one or more second communication devices over a communication channel, the first communication device comprising a network interface device configured to: generate a first bandwidth indication of a first bandwidth of a first channel segment of the communication channel; generate a second bandwidth indication of a second bandwidth of a second channel segment of the communication channel, the second bandwidth indication being separate from the first bandwidth indication, wherein the first channel segment does not overlap in frequency with the second channel segment; generate one or more media access control protocol (MAC) data units to include the first bandwidth indication and the second bandwidth indication; and transmit the one or more MAC data units to the one or more second communication devices to indicate the first bandwidth of the first channel segment and the second bandwidth of the second channel segment to the one or more second communication devices.

In other embodiments, the first communication device includes one of, or any suitable combination of two or more of, the following features.

The first bandwidth of the first channel segment is different from the second bandwidth of the second channel segment.

The network interface device includes i) a first radio frequency (RF) radio configured for operation in the first channel segment and not in the second channel segment and ii) a second RF radio configured for operation in the second channel segment and not the first channel segment.

The network interface device is configured to: generate the one or more MAC data units to include the first bandwidth indication and the second bandwidth indication at least by generating i) a first MAC data unit to include the first bandwidth indication and ii) a second MAC data unit to include the second bandwidth indication; transmit, via the first RF radio in the first channel segment, the first MAC data unit that includes the first bandwidth indication of the first bandwidth of the first channel segment; and transmit, via the second RF radio in the second channel segment, the second MAC data unit that includes the second bandwidth indication of the second bandwidth of the second channel segment.

The network interface device is configured to transmit the first MAC data unit in the first channel segment synchronously with transmitting the second MAC data unit in the second channel bandwidth.

The network interface device is configured to: generate the one or more MAC data units at least by generating a single MAC data unit to include both the first bandwidth indication of the first bandwidth of the first channel segment and the second bandwidth indication of the second bandwidth of the second channel segment; and transmit the one or more MAC data units at least by one of i) transmitting the single MAC data unit in the first channel segment without transmitting the MAC data unit in the second channel segment or i) transmitting the single data in the second channel segment without transmitting the MAC data unit in the first channel segment.

The first channel segment comprises a first plurality of component channels including a first primary channel and one or more first secondary channels.

The second channel segment comprises a second plurality of component channels including a second primary channel and one or more second secondary channels.

The network interface device is configured to generate the one or more MAC data units at least by generating the one or more data units to further include i) a first primary channel indication indicating a first location, in the first channel segment, of the first primary channel and ii) a second primary channel indication indicating a second location, in the second channel segment, of the second primary channel.

The network interface device is further configured to: receive an indication of an operating channel of a particular second communication device of one or more second communication devices, wherein the operating channel of the particular second communication device i) does not include any primary channel of the operating channel of the first communication device and ii) spans multiple secondary channels of the operating channel of the first communication device; and transmit a physical layer protocol data units (PPDU) to the particular second communication device, wherein the PPDU i) does not span any primary channel of the operating channel of the first communication device and ii) spans multiple secondary channels of the operating channel of the first communication device.

The network interface device is further configured to, after transmitting the one or more MAC data units to the one or more second communication devices, update, with the network interface device of the first communication device, one or both of i) the first bandwidth of the first channel segment of the operating channel of the first communication device and ii) the second bandwidth of the second channel segment of the operating channel of the first communication device for subsequent operation, wherein the updating includes: generating an additional MAC data unit to include to include a third bandwidth indication indicating a third bandwidth of the first segment field and a fourth bandwidth indication indicating a fourth bandwidth of the second channel bandwidth; and transmitting the additional MAC data unit to the one or more second communication devices to indicate to the one or more second communication devices that i) the bandwidth of the first segment channel is updated from the first bandwidth to the third bandwidth and ii) the bandwidth of the second segment channel is updated from the second bandwidth to the fourth bandwidth.

The third bandwidth is the same as the first bandwidth and the fourth bandwidth is different from the second bandwidth.

The third bandwidth is different from the first bandwidth and the fourth bandwidth is the same as the second bandwidth, and The third bandwidth is the different from the first bandwidth and the fourth bandwidth is the different from the second bandwidth.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for operation of a first communication device in a communication network, the method comprising:
   generating, at a network interface of the first communication device, a first bandwidth indication of a first bandwidth of a first channel segment of an operating channel of the communication network;
   generating, at the network interface device, a second bandwidth indication of a second bandwidth of a second channel segment of the operating channel of the communication network, the second bandwidth indication being separate from the first bandwidth indication, wherein
      i) the first channel segment and the second channel segment form the operating channel of the communication network and
      ii) the first channel segment does not overlap in frequency with the second channel segment;
   generating, at the network interface device, one or more media access control protocol (MAC) data units to include the first bandwidth indication and the second bandwidth indication; and
   transmitting, with the network interface device, the one or more MAC data units to one or more second communication devices to indicate the first bandwidth of the first channel segment and the second bandwidth of the second channel segment of the operating channel of the communication network, to the one or more second communication devices;
   wherein the network interface device of the first communication device includes,
      i) a first radio frequency (RF) radio configured for operation in the first channel segment and not in the second channel segment and
      ii) a second RF radio configured for operation in the second channel segment and not the first channel segment;
   wherein generating the one or more MAC data units to include the first bandwidth indication and the second bandwidth indication comprises generating,
      i) a first MAC data unit to include the first bandwidth indication and
      ii) a second MAC data unit to include the second bandwidth indication, and
   wherein transmitting the one or more MAC data units comprises,
      transmitting, via the first RF radio in the first channel segment, the first MAC data unit that includes the first bandwidth indication of the first bandwidth of the first channel segment, and
      transmitting, via the second RF radio in the second channel segment, the second MAC data unit that includes the second bandwidth indication of the second bandwidth of the second channel segment.

2. The method of claim 1,
   wherein the first bandwidth of the first channel segment is different from the second bandwidth of the second channel segment.

3. The method of claim 1, wherein transmission of the first MAC data unit in the first channel segment is synchronized with transmission of the second MAC data unit in the second channel bandwidth.

4. The method of claim 1, wherein
   generating the one or more MAC data units comprises generating a single MAC data unit to include both the first bandwidth indication of the first bandwidth of the first channel segment and the second bandwidth indication of the second bandwidth of the second channel segment, and
   transmitting the one or more MAC data units comprises one of
      i) transmitting the single data in the first channel segment without transmitting the MAC data unit in the second channel segment or
      ii) transmitting the single data in the second channel segment without transmitting the MAC data unit in the first channel segment.

5. The method of claim 1,
   wherein
      the first channel segment comprises a first plurality of component channels including a first primary channel and one or more first secondary channels,
      the second channel segment comprises a second plurality of component channels including a second primary channel and one or more second secondary channels, and
   generating the one or more MAC data units comprises generating the one or more MAC data units to further include i) a first primary channel indication indicating a first location, in the first channel segment, of the first primary channel and ii) a second primary channel indication indicating a second location, in the second channel segment, of the second primary channel.

6. The method of claim 5, further comprising receiving, at the network interface device of the first communication device, an indication of an operating channel of a particular second communication device of the one or more second communication devices, wherein the operating channel of the particular second communication device i) does not include any primary channel of the operating channel of the communication network and ii) spans multiple secondary channels of the operating channel of the communication network, and transmitting, with the network interface device of the first communication device, a physical layer protocol data units (PPDU) to the particular second communication device, wherein the PPDU i) does not span any primary channel of the operating channel of the communication network and ii) spans multiple secondary channels of the operating channel of the communication network.

7. The method of claim 1, after transmitting the one or more MAC data units to the one or more second communication devices, updating, with the network interface device of the first communication device, one or both of i) the first bandwidth of the first channel segment of the operating channel of the communication network and ii) the second bandwidth of the second channel segment of the operating channel of the communication network for subsequent operation, including:

generating an additional MAC data unit to include a third bandwidth indication indicating a third bandwidth of the first channel segment and a fourth bandwidth indication indicating a fourth bandwidth of the second channel segment, and transmitting the additional MAC data unit to the one or more second communication devices to indicate to the one or more second communication devices that i) the bandwidth of the first channel segment is updated from the first bandwidth to the third bandwidth and ii) the bandwidth of the second channel segment is updated from the second bandwidth to the fourth bandwidth.

8. The method of claim 7, wherein one of:

i) a) the third bandwidth is the same as the first bandwidth and b) the fourth bandwidth is different from the second bandwidth, ii) a) the third bandwidth is different from the first bandwidth and b) the fourth bandwidth is the same as the second bandwidth, and iii) a) the third bandwidth is the different from the first bandwidth and b) the fourth bandwidth is the different from the second bandwidth.

9. A first communication device configured for operating in a communication network, the first communication device comprising a network interface device configured to:

generate a first bandwidth indication of a first bandwidth of a first channel segment of an operating channel of the communication network;

generate a second bandwidth indication of a second bandwidth of a second channel segment of the operating channel of the communication network, the second bandwidth indication being separate from the first bandwidth indication, wherein i) the first channel segment and the second channel segment form the operating channel of the communication network and ii) the first channel segment does not overlap in frequency with the second channel segment;

generate one or more media access control protocol (MAC) data units to include the first bandwidth indication and the second bandwidth indication; and transmit the one or more MAC data units to one or more second communication devices to indicate the first bandwidth of the first channel segment and the second bandwidth of the second channel segment of the operating channel of the communication network, to the one or more second communication devices;

wherein the network interface device is configured to, generate the one or more MAC data units at least by generating a single MAC data unit to include both the first bandwidth indication of the first bandwidth of the first channel segment and the second bandwidth indication of the second bandwidth of the second channel segment, and transmit the one or more MAC data units at least by one of, i) transmitting the single MAC data unit in the first channel segment without transmitting the MAC data unit in the second channel segment, or ii) transmitting the single data in the second channel segment without transmitting the MAC data unit in the first channel segment.

10. The first communication device of claim 9, wherein the first bandwidth of the first channel segment is different from the second bandwidth of the second channel segment.

11. The first communication device of claim 9, wherein the network interface device includes i) a first radio frequency (RF) radio configured for operation in the first channel segment and not in the second channel segment and ii) a second RF radio configured for operation in the second channel segment and not the first channel segment.

12. The first communication device of claim 11, wherein the network interface device is configured to generate the one or more MAC data units to include the first bandwidth indication and the second bandwidth indication at least by generating i) a first MAC data unit to include the first bandwidth indication and ii) a second MAC data unit to include the second bandwidth indication, transmit, via the first RF radio in the first channel segment, the first MAC data unit that includes the first bandwidth indication of the first bandwidth of the first channel segment, and transmit, via the second RF radio in the second channel segment, the second MAC data unit that includes the second bandwidth indication of the second bandwidth of the second channel segment.

13. The first communication device of claim 12, wherein the network interface device is configured to transmit the first MAC data unit in the first channel segment synchronously with transmitting the second MAC data unit in the second channel bandwidth.

14. The first communication device of claim 9, wherein
the first channel segment comprises a first plurality of component channels including a first primary channel and one or more first secondary channels,
the second channel segment comprises a second plurality of component channels including a second primary channel and one or more second secondary channels, and
the network interface device is configured to generate the one or more MAC data units at least by generating the one or more data units to further include
  i) a first primary channel indication indicating a first location, in the first channel segment, of the first primary channel and
  ii) a second primary channel indication indicating a second location, in the second channel segment, of the second primary channel.

15. The first communication device of claim 14,
wherein the network interface device is further configured to
receive an indication of an operating channel of a particular second communication device of the one or more second communication devices, wherein the operating channel of the particular second communication device
  i) does not include any primary channel of the operating channel of the communication network and
  ii) spans multiple secondary channels of the operating channel of the communication network, and
transmit a physical layer protocol data units (PPDU) to the particular second communication device, wherein the PPDU
  i) does not span any primary channel of the operating channel of the communication network and
  ii) spans multiple secondary channels of the operating channel of the communication network.

16. The first communication device of claim 9,
wherein the network interface device is further configured to, after transmitting the one or more MAC data units to the one or more second communication devices, update, with the network interface device of the first communication device, one or both of
  i) the first bandwidth of the first channel segment of the operating channel of the communication network and
  ii) the second bandwidth of the second channel segment of the operating channel of the communication network for subsequent operation,
wherein the updating includes:
generating an additional MAC data unit to include a third bandwidth indication indicating a third bandwidth of the first channel segment and a fourth bandwidth indication indicating a fourth bandwidth of the second channel segment, and
transmitting the additional MAC data unit to the one or more second communication devices to indicate to the one or more second communication devices that
  i) the bandwidth of the first channel segment is updated from the first bandwidth to the third bandwidth and
  ii) the bandwidth of the second channel segment is updated from the second bandwidth to the fourth bandwidth.

17. The first communication device of claim 16, wherein one of:
  i) a) the third bandwidth is the same as the first bandwidth and b) the fourth bandwidth is different from the second bandwidth,
  ii) a) the third bandwidth is different from the first bandwidth and b) the fourth bandwidth is the same as the second bandwidth, and
  iii) a) the third bandwidth is the different from the first bandwidth and b) the fourth bandwidth is the different from the second bandwidth.

18. A first communication device configured for operating in a communication network, the first communication device comprising a network interface device configured to:
generate a first bandwidth indication of a first bandwidth of a first channel segment of an operating channel of the communication network;
generate a second bandwidth indication of a second bandwidth of a second channel segment of the operating channel of the communication network, the second bandwidth indication being separate from the first bandwidth indication, wherein
  i) the first channel segment and the second channel segment form the operating channel of the communication network and
  ii) the first channel segment does not overlap in frequency with the second channel segment;
generate one or more media access control protocol (MAC) data units to include the first bandwidth indication and the second bandwidth indication; and
transmit the one or more MAC data units to one or more second communication devices to indicate the first bandwidth of the first channel segment and the second bandwidth of the second channel segment of the operating channel of the communication network, to the one or more second communication devices;
wherein the network interface device includes,
  i) a first radio frequency (RF) radio configured for operation in the first channel segment and not in the second channel segment and
  ii) a second RF radio configured for operation in the second channel segment and not the first channel segment;
wherein the network interface device is configured to,
  generate the one or more MAC data units to include the first bandwidth indication and the second bandwidth indication at least by generating
    i) a first MAC data unit to include the first bandwidth indication and
    ii) a second MAC data unit to include the second bandwidth indication,
  transmit, via the first RF radio in the first channel segment, the first MAC data unit that includes the first bandwidth indication of the first bandwidth of the first channel segment, and
  transmit, via the second RF radio in the second channel segment, the second MAC data unit that includes the second bandwidth indication of the second bandwidth of the second channel segment.

* * * * *